United States Patent
Vidrighin et al.

(10) Patent No.: US 12,292,669 B2
(45) Date of Patent: May 6, 2025

(54) COUPLED RESONATOR PHOTON-PAIR SOURCES

(71) Applicant: Psiquantum, Corp., Palo Alto, CA (US)

(72) Inventors: Mihai Dorian Vidrighin, Palo Alto, CA (US); Damien Bonneau, Le Pradet (FR); Alessandro Farsi, Mountain View, CA (US); Mark G. Thompson, Palo Alto, CA (US)

(73) Assignee: Psiquantum, Corp., Palo Alto, CA (US)

( * ) Notice: Subject to any disclaimer, the term of this patent is extended or adjusted under 35 U.S.C. 154(b) by 36 days.

(21) Appl. No.: 18/204,185

(22) Filed: May 31, 2023

(65) Prior Publication Data

US 2024/0027872 A1    Jan. 25, 2024

Related U.S. Application Data

(63) Continuation of application No. 17/321,077, filed on May 14, 2021, now Pat. No. 11,698,570, which is a
(Continued)

(51) Int. Cl.
*G02F 1/365*      (2006.01)
*G02F 1/35*       (2006.01)
(Continued)

(52) U.S. Cl.
CPC ............ *G02F 1/365* (2013.01); *G02F 1/3536* (2013.01); *H04B 10/70* (2013.01);
(Continued)

(58) Field of Classification Search
CPC .................................................. G02B 6/29343
See application file for complete search history.

(56) References Cited

U.S. PATENT DOCUMENTS

| | | | | |
|---|---|---|---|---|
| 6,847,759 B2 * | 1/2005 | Shibata | .............. | G02B 6/29353 385/32 |
| 6,947,642 B2 * | 9/2005 | Yamazaki | .......... | G02B 6/29353 385/24 |

(Continued)

FOREIGN PATENT DOCUMENTS

| CN | 106371174 A | * | 2/2017 |
|---|---|---|---|
| CN | 114675465 A | | 6/2022 |

OTHER PUBLICATIONS

R. Boeck et al. Experimental demonstration of a silicon-on-insulator high-performance double microring filter using MZI-based coupling. Optics Letters, 40:2:276-279, Jan. 15, 2015 (https://doi.org/10.1364/OL.40.000276) (Year: 2015).*

(Continued)

*Primary Examiner* — Michael Stahl
(74) *Attorney, Agent, or Firm* — Kilpatrick Townsend & Stockton LLP

(57) ABSTRACT

Techniques disclosed herein relate to photon sources with high spectral purity and high brightness. In one embodiment, a photon-pair source includes a pump waveguide, a first resonator coupled to the pump waveguide to couple pump photons from the pump waveguide into the first resonator, a second resonator coupled to the first resonator, and an output waveguide coupled to the second resonator. The second resonator is configured to convert the pump photons into photon pairs. The second resonator and the first resonator are configured to cause a coupling-induced resonance splitting in the second resonator or the first resonator. The second resonator and the output waveguide are configured to couple the photon pairs from the second resonator into the output waveguide. In some embodiments, the photo-pair source includes one or more tuners for tuning at least one of the first resonator or the second resonator.

20 Claims, 14 Drawing Sheets

Related U.S. Application Data continuation of application No. PCT/US2019/038311, filed on Jun. 20, 2019, which is a continuation of application No. 16/192,770, filed on Nov. 15, 2018, now Pat. No. 10,372,014.

(51) Int. Cl.
  *H04B 10/70* (2013.01)
  *G02B 6/293* (2006.01)
  *G02F 1/39* (2006.01)

(52) U.S. Cl.
  CPC .......... *G02B 6/29343* (2013.01); *G02F 1/395* (2013.01); *G02F 2201/302* (2013.01)

(56) References Cited

U.S. PATENT DOCUMENTS

| | | | |
|---|---|---|---|
| 2010/0209038 A1* | 8/2010 | Popovic | G02F 1/3133 385/27 |
| 2010/0289408 A1 | 11/2010 | Jia et al. | |
| 2012/0308181 A1 | 12/2012 | Hafezi et al. | |
| 2014/0193155 A1 | 7/2014 | Popovic et al. | |
| 2015/0260916 A1 | 9/2015 | Cherchi et al. | |
| 2016/0041032 A1 | 2/2016 | Matthews et al. | |
| 2017/0075190 A1 | 3/2017 | Rudolph et al. | |
| 2017/0212405 A1 | 7/2017 | Pant et al. | |
| 2017/0293082 A1 | 10/2017 | Mower et al. | |
| 2018/0335570 A1 | 11/2018 | Fanto et al. | |
| 2020/0401012 A1* | 12/2020 | Xu | G02F 1/353 |
| 2021/0080804 A1 | 3/2021 | Liscidini et al. | |

OTHER PUBLICATIONS

U.S. Appl. No. 16/192,770, "Non-Final Office Action", Feb. 4, 2019, 7 pages.
U.S. Appl. No. 16/192,770, "Notice of Allowance", Apr. 25, 2019, 5 pages.
U.S. Appl. No. 17/321,077, "Non-Final Office Action", Nov. 15, 2022, 7 pages.
U.S. Appl. No. 17/321,077, "Notice of Allowance", Feb. 28, 2023, 5 pages.
Bonneau, et al., "Effect of Loss on Multiplexed Single-Photon Sources", New Journal of Physics, vol. 17, Apr. 2015, pp. 1-15.
Chuprina, et al., "Generating Pure Single-Photon States Via Spontaneous Four-Wave Mixing in a System of Coupled Microresonators", Laser Physics Letters, vol. 15, No. 10, Aug. 15, 2018, pp. 1-6.
Davanco, et al., "Telecommunications-Band Heralded Single Photons from a Silicon Nanophotonic Chip", Applied Physics Letters, vol. 100, No. 26, Jan. 2012, pp. 261104-1-261104-4.
Guo, et al., "Parametric Down-Conversion Photon Pair Source on a Nanophotonic Chip", Light: Science & Applications, vol. 6, No. 5, Mar. 2016, pp. 1-9.
Kumar, et al., "Spectrally Multiplexed and Tunable-Wavelength Photon Pairs at 1.55 μm from a Silicon Coupled- Resonator Optical Waveguide", Optics Letters, vol. 38, No. 16, Aug. 15, 2013, pp. 2969-2971.
Passaro, "Optimal Design of Grating-Assisted Directional Couplers", Journal of Lightwave Technology, vol. 18, No. 7, Jul. 2000, pp. 973-984.
PCT/US2019/038311, "International Preliminary Report on Patentability", May 27, 2021, 6 pages.
PCT/US2019/038311, "International Search Report and Written Opinion", Aug. 2, 2019, 7 pages.
Shi, et al., "Contradirectional Couplers in Silicon-on-Insulator Rib Waveguides", Optics Letters, vol. 36, No. 20, Oct. 15, 2011, pp. 3999-4001.
Syahriar, "Mach Zehnder Interferometer for Wavelength Division Multiplexing", Proceedings, Komputer Dan Sistem Intelijen (KOMMIT 2002), Aug. 21-22, 2002, pp. A-45-A-50.
Vernon, et al., "Truly Unentangled Photon Pairs Without Spectral Filtering", Optics Letters, vol. 42, No. 18, Sep. 15, 2017, pp. 3638-3641.

\* cited by examiner

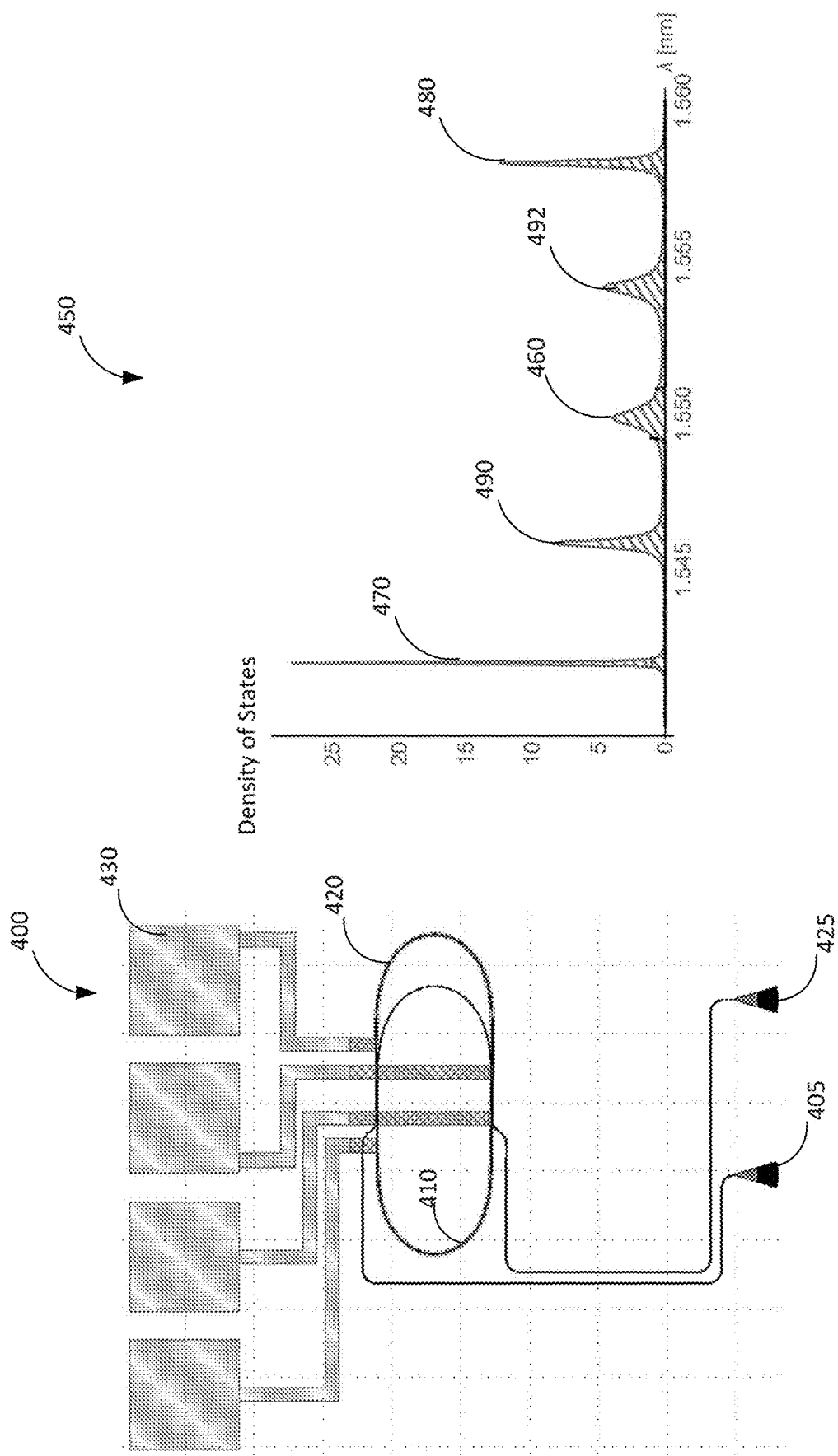

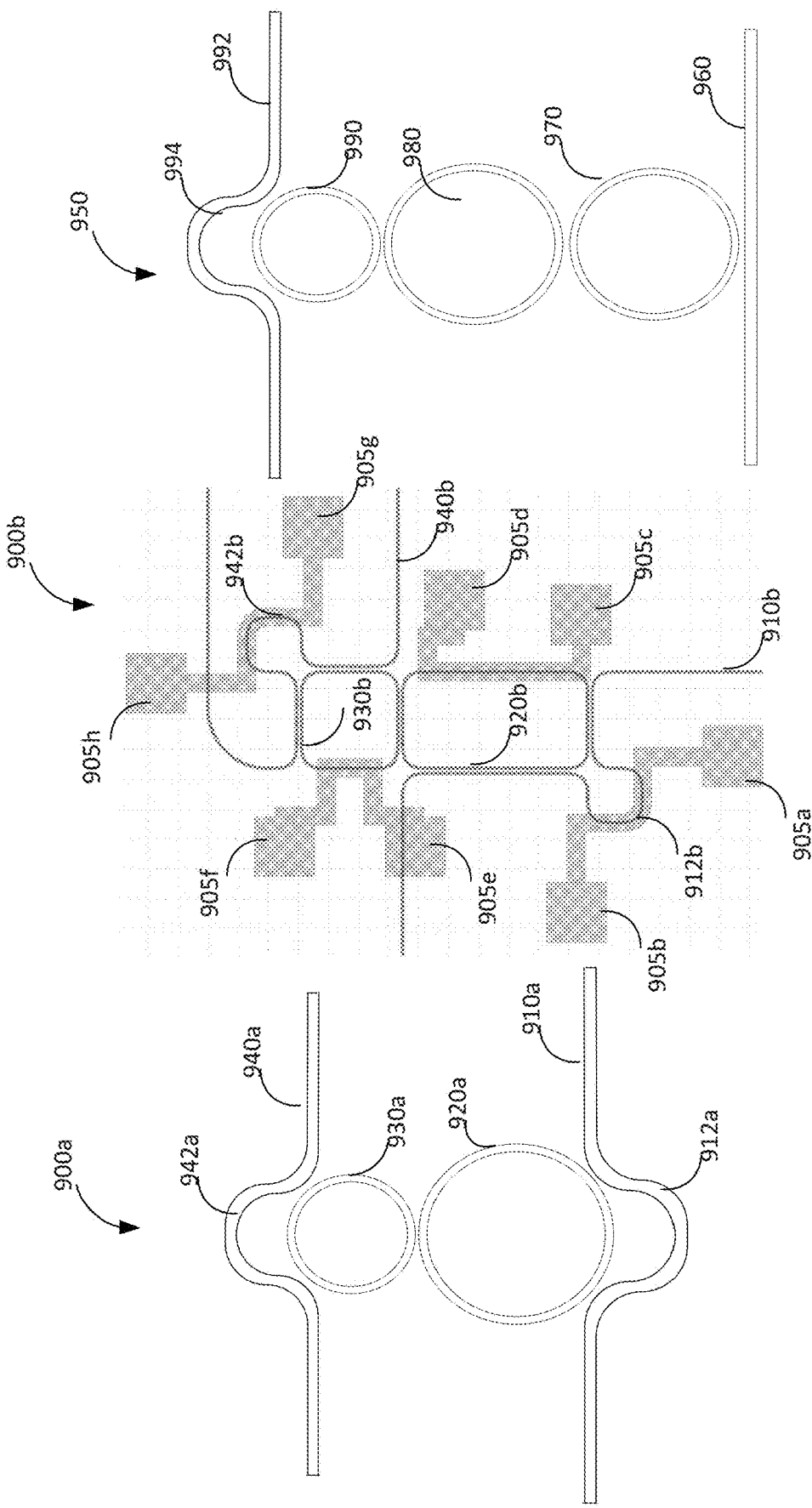

COUPLED RESONATOR PHOTON-PAIR SOURCES

CROSS REFERENCE TO RELATED APPLICATION

This application is a continuation of U.S. patent application Ser. No. 17/321,077, filed May 14, 2021, now U.S. Pat. No. 11,698,570, issued Jul. 11, 2023, which is a continuation of International Patent Application No. PCT/US2019/038311, filed Jun. 20, 2019, which claims priority to U.S. application Ser. No. 16/192,770, filed Nov. 15, 2018, now U.S. Pat. No. 10,372,014, issued Aug. 6, 2019, the disclosures of which are hereby incorporated by reference in their entirety for all purposes.

BACKGROUND

Photon sources may be used in many photonic quantum technologies, where an ideal photon source would generate single photons deterministically. Photon sources may be based on heralded photon pairs generated by, for example, spontaneous four wave mixing (SFWM) or spontaneous parametric down-conversion (SPDC) in passive nonlinear optical media.

SUMMARY

This disclosure relates generally to photon sources. More specifically, this disclosure relates to photon-pair sources including multiple coupled resonators that can provide photon pairs with both a high spectral purity and a high brightness (or low pump power).

In accordance with an example implementation, a device (e.g., a coupled resonator photon-pair source) may include a pump waveguide configured to transport pump photons, and a first resonator coupled to the pump waveguide, where the first resonator and the pump waveguide may be configured to couple the pump photons from the pump waveguide into the first resonator. The device may also include a second resonator coupled to the first resonator, where the second resonator and the first resonator may be configured to cause a coupling-induced resonance splitting in the second resonator or the first resonator to broaden the pump resonance spectrum, and the second resonator may be configured to convert the pump photons into photon pairs. The device may further include an output waveguide coupled to the second resonator, where the second resonator and the output waveguide may be configured to couple the photon pairs from the second resonator into the output waveguide.

In some embodiments, the first resonator may be characterized by a first quality factor lower than a second quality factor of the second resonator. In some embodiments, the coupling-induced resonance splitting in the second resonator or the first resonator may occur at a wavelength of the pump photons and broadens a pump resonance spectrum of the second resonator or the first resonator. The second resonator includes a non-linear optical material that causes spontaneous four wave mixing (SFWM) using the pump photons.

In some embodiments, the first resonator may be coupled to the pump waveguide through a Mach Zehnder interferometer or a grating coupler. The grating coupler may be configured to cause contra-directional coupling of the pump photons from the pump waveguide to the first resonator. In some embodiments, the second resonator may be coupled to the output waveguide through a Mach Zehnder interferometer or a grating coupler. In some embodiments, the second resonator may be coupled to the output waveguide through a third resonator, and the third resonator may be configured to cause resonance of the photon pairs but not the pump photons in the third resonator. In some embodiments, the second resonator may be coupled to the first resonator through a Mach Zehnder interferometer.

In some embodiments, the device may further include a splitter coupled to the output waveguide, where the splitter may be configured to direct photons that have different wavelengths in each photon pair to two different output channels. The splitter may include a wavelength division demultiplexer (WDDM). In some embodiments, the device may also include a single photon detector coupled to one of the two different output channels of the splitter. In some embodiments, the device may also include two or more electrodes, where the first resonator or the second resonator may include a tunable portion, and the two or more electrodes may be configured to apply a voltage signal at the tunable portion to cause a refractive index change in the tunable portion of the first resonator or the second resonator.

In some embodiments, at least one of the first resonator or the second resonator may be elongated in a first direction, and the first resonator and the second resonator may be coupled along the first direction. The first resonator and the second resonator may only include Euler bends. In some embodiments, a coupling length between the pump waveguide and the first resonator, a coupling length between the first resonator and the second resonator, and a coupling length between the second resonator and the output waveguide may each be greater than a respective threshold value.

According to another embodiments, a single-photon source may include a plurality of heralded photon sources. Each of the plurality of heralded photon sources may include a pump waveguide configured to transport pump photons, a first resonator coupled to the pump waveguide and is configured to couple the pump photons from the pump waveguide into the first resonator, a second resonator coupled to the first resonator, and an output waveguide coupled to the second resonator. The second resonator and the first resonator may be configured to cause a coupling-induced resonance splitting in the second resonator or the first resonator. The second resonator may be configured to convert the pump photons into photon pairs. The second resonator and the output waveguide may be configured to couple the photon pairs from the second resonator into the output waveguide. The plurality of heralded photon sources may be serially coupled, where the pump waveguide of a heralded photon source in the plurality of heralded photon sources may be coupled to the pump waveguide of a subsequent heralded photon source in the plurality of heralded photon sources, and the output waveguide of the heralded photon source may be coupled directly or indirectly (e.g., through a coupler or a filter, such as a wavelength division demultiplexer) to the output waveguide of the subsequent heralded photon source.

In some embodiments of the single-photon source, the first resonator may be characterized by a first quality factor lower than a second quality factor of the second resonator, and the coupling-induced resonance splitting in the second resonator or the first resonator may occur at a wavelength of the pump photons and may broaden a pump resonance spectrum of the second resonator or the first resonator. In some embodiments, the first resonator may be coupled to the pump waveguide through a Mach Zehnder interferometer or a grating coupler.

In some embodiments, each of the plurality of heralded photon sources may further include a wavelength division demultiplexer (WDDM) coupled to the output waveguide, where the WDDM may be configured to direct photons that have different wavelengths in each photon pair to two different output channels. Each of the plurality of heralded photon sources may further include a single photon detector coupled to one of the two different output channels. Each of the plurality of heralded photon sources may further include two or more electrodes, where the first resonator or the second resonator may include a tunable portion, and the two or more electrodes may be configured to apply a voltage signal at the tunable portion to cause a refractive index change in the tunable portion of the first resonator or the second resonator. In some embodiments, each of the plurality of heralded photon sources may further include a circuit configured to, based on an output of the single photon detector, apply the voltage signal at the tunable portion of a subsequent heralded photon source using the two or more electrodes.

Systems and methods disclosed herein can improve the spectral purity and brightness of the photons generated by a photon-pair source. The photon-pair source can be tuned or turned on or off by tuning at least one resonator, such as the pump resonator, whereas the photon-pair resonator may not be changed and thus may be transparent to photons (e.g., generated by an upstream photon-pair source) traveling through it. As such, multiple such photon-pair sources may be cascaded to deterministically generate single photons. In addition, the coupled resonator structure can also provide isolation between the signal/idler bus and the pump bus.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

FIG. 4A is an example layout of an example of a photon-pair source that includes a resonator ring and a Mach Zehnder interferometer (MZI).

FIG. 4B is a diagram illustrating the output spectrum of the photon-pair source shown in FIG. 4A.

FIG. 9A illustrates an example of a photon-pair source according to certain embodiments.

FIG. 9B illustrates an example of a photon-pair source according to certain embodiments.

FIG. 9C illustrates an example of a photon-pair source according to certain embodiments.

DETAILED DESCRIPTION

Figure 1:
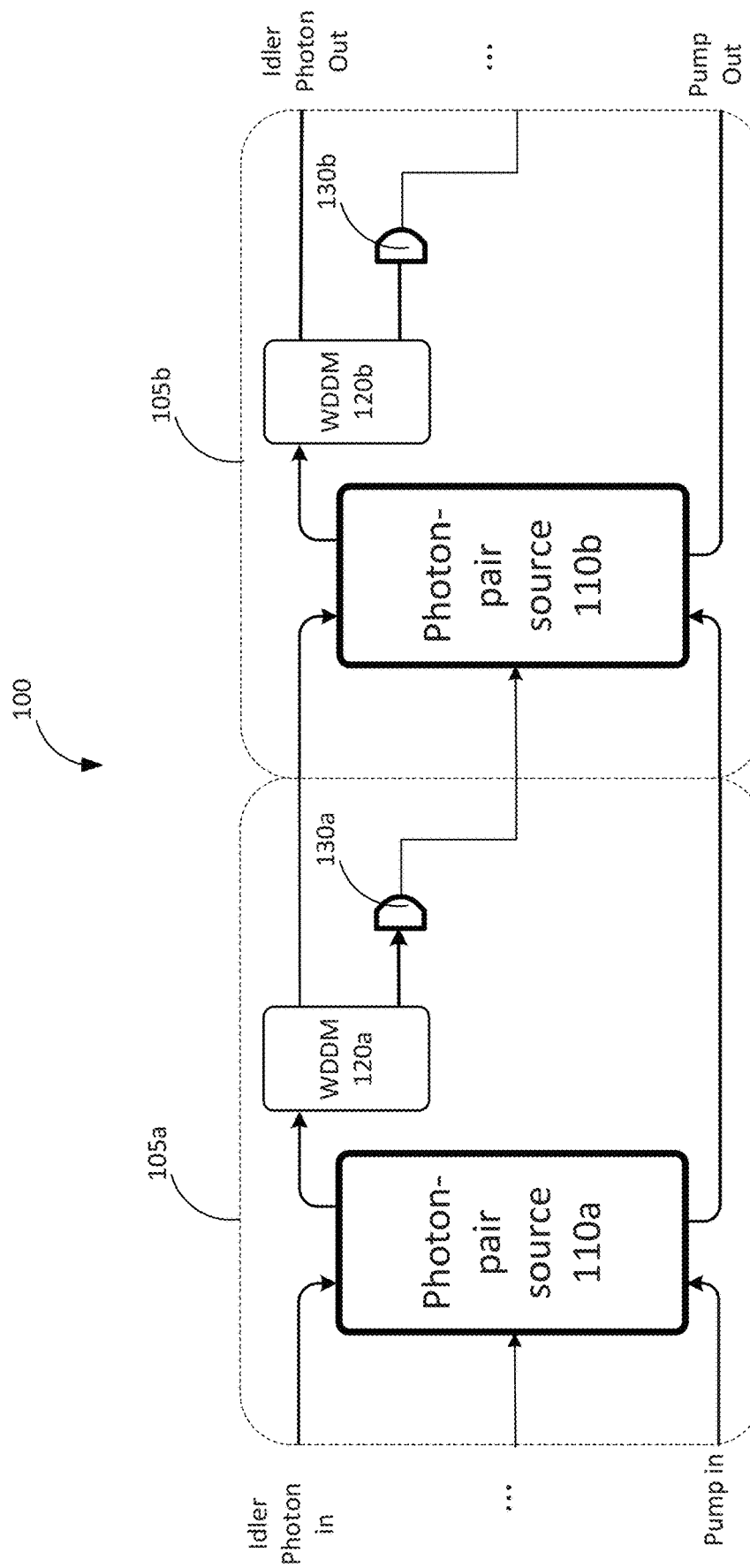
FIG. 1 illustrates an example of a single-photon source that includes multiple heralded photon sources according to certain embodiments.

Techniques disclosed herein relate generally to photon sources. More specifically, techniques disclosed herein relate to photon-pair sources including multiple coupled resonators that can provide photon pairs with both a high spectral purity and a high brightness (or low pump power). Various inventive embodiments are described herein, including methods, processes, systems, devices, and the like.

Many photonic quantum technologies use single-photon sources. An ideal single-photon source would generate single photons deterministically. One way to achieve a deterministic single-photon source is to use cascaded (or multiplexed) heralded photon sources based on, for example, spontaneous four wave mixing (SFWM) or spontaneous parametric down-conversion (SPDC) in third-order passive nonlinear optical material. In each heralded photon source (HPS), photons may be non-deterministically produced in pairs (which includes a signal photon and an idler photon), where one photon (e.g., the signal photon) heralds the existence of the other photon (e.g., the idler photon) in the pair. Thus, if a signal photon (also referred to as herald photon) is detected at one heralded photon source, the corresponding idler photon can be used as the output of the single-photon source, while other heralded photon sources in the cascaded (or multiplexed) heralded photon sources of the single-photon source can be bypassed or switched off.

It is generally desirable that photons in each photon pair generated by a photon-pair source be unentangled in order to yield heralded single photons in pure states to ensure high-visibility quantum interference, for example, in optical quantum computing. In addition to high spectral purity, other characteristics, such as high brightness (or low pump power), high isolation between the pump and the output, ease of switching (to turn off other sources after a signal photon is detected), high heralding efficiency (or low loss), suppression of multi-photon entanglement, may also be desired. However, the time-energy entanglement of the photon pair caused by the impurity due to parametric fluorescence is often difficult to eliminate without compromising other performance characteristics of the photon-pair source, such as the brightness. For example, spectral filtering of the generated photon pairs to improve the spectral purity may reduce the number of photon pairs generated and the heralding efficiency of the source. In another example, an HPS that includes a broader pump and wavelength-dependent coupling regions in a resonator (e.g., implemented using Mach Zehnder interferometers (MZIs)) may achieve a higher purity, but the brightness may be degraded.

According to certain embodiments, a photon-pair source including multiple coupled resonators can generate photon pairs with both a high spectral purity and a high brightness (or low pump power). In one embodiment, the photon-pair source may include a pump resonator (e.g., a ring resonator) and a photon-pair resonator (e.g., a ring or disk resonator). The pump resonator and photon-pair resonator may have different sizes with different resonance spectra and free spectral ranges, but may be aligned around one frequency. The pump resonator and photon-pair resonator may be independently trimmed or tuned to have different resonance and coupling characteristics. For example, the pump resonance ring can be larger than the photon-pair resonator. The pump resonance ring may have a lower quality factor (and thus a wider resonant linewidth) than the photon-pair resonator, and thus the pump resonance spectrum may be broader. Furthermore, when coupled, the pump resonator and the photon-pair resonator can cause coupling-induced resonance splitting, which may further broaden the pump spectrum. The spectral purity of the photons generated by the photon-pair source can be improved due to the broadening of the pump resonance spectrum (e.g., by resonance splitting), without affecting the brightness of the photons.

In some embodiments, the pump resonator and photon-pair resonator may be independently and dynamically tuned or switched. In some embodiments, the pump resonator may be detuned to turn off an HPS in a set of multiplexed or cascaded HPSes, which may leave the photon-pair resonator of the HPS unaffected and transparent to photons from other HPSes that travel through the photon-pair resonator. The multiple resonators may also allow the pump and signal/idler photons to travel in the same direction to make the layout more favorable.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Quantum mechanics can have many advantages in encoding, transmission, and processing of information. For example, quantum key distribution may be used to achieve perfectly secure communication. Quantum metrology can be used to achieve precision measurements that could not be achieved without using quantum mechanics. In particular, a quantum computer based on quantum mechanical effects can offer exponentially faster computation or higher computation throughput. Some systems based on quantum mechanics can use both optical components and electrical circuits. Some other optical communication systems or network technologies based on traditional processing units also use both optical components and electronic circuits. These systems generally include separate optical components and electronic circuits. In some systems, in order to reduce the cost and improve the performance, some optical components may be manufactured on semiconductor wafers, such as silicon wafers, to take advantages of semiconductor processing technologies.

As described above, single-photon sources may be needed in many photonic quantum technologies. An ideal single-photon source would generate single photons deterministically. One way to achieve a deterministic single-photon source is to use cascaded (or multiplexed) heralded photon sources based on, for example, spontaneous four wave mixing (SFWM) or spontaneous parametric down-conversion (SPDC) in passive nonlinear optical media. In each heralded photon source (HPS), photons may be non-deterministically produced in pairs (which includes a signal photon and an idler photon), where one photon (e.g., signal photon) heralds the existence of the other photon (e.g., idler photon) in the pair. Thus, if a signal photon is detected at one heralded photon source, the corresponding idler photon can be used as the output of the single-photon source, while other heralded photon sources in the cascaded (or multiplexed) heralded photon sources of the single-photon source can be bypassed or switched off.

FIG. 1 is a simplified block diagram of an example of a single-photon source 100 that may include a set of cascaded or multiplexed heralded photon sources according to certain embodiments. In the example shown in FIG. 1, single-photon source 100 may include multiple heralded photon sources 105a, 105b, and the like, which may be collectively referred to as HPSes 105. Each HPS 105 may include a photon-pair source, such as a photon-pair source 110a in HPS 105a or a photon-pair source 110b in HPS 105b. Each photon-pair source may generate a pair of photons based on, for example, spontaneous four wave mixing (SFWM) in third-order passive nonlinear optical materials or spontaneous parametric down-conversion (SPDC) in second-order passive nonlinear optical materials. In some implementations, a photon-pair source may include a ring resonator that may support multiple resonances as described in detail below.

In each photon-pair source 110a or 110b, photons may be non-deterministically produced in pairs (a signal photon and an idler photon), where the existence of one photon (e.g., signal photon) may indicate the existence of the other photon (e.g., idler photon) in the pair. Each pair of photons may be split by a splitter, such as, for example, a wavelength division demultiplexing (WDDM) device 120a or 120b, based on their different frequencies to two output channels. One photon (which may be referred to as the signal photon or herald photon) on one output channel of the splitter (e.g., WDDM device 120a or 120b) may be detected by a single photon detector (SPD) 130a or 130b. If a single photon is detected by an SPD, a corresponding photon (referred to as an idler photon) that is generated in pair with the detected single photon would exist on a different output channel of the splitter, and thus can be used as the output of the single-photon source. The detection of the signal photon by the SPD can cause other heralded photon sources in the cascaded (or multiplexed) heralded photon sources of the single-photon source be bypassed or switched off. For example, as shown in FIG. 1, when a signal photon is detected by SPD 130$a$, photon-pair source 110$b$ may be turned off or bypassed. The idler photon from HPS 105$a$ may pass through photon-pair source 110$b$ and WDDM device 120$b$ as an output of HPS 105$b$.

Figure 2:
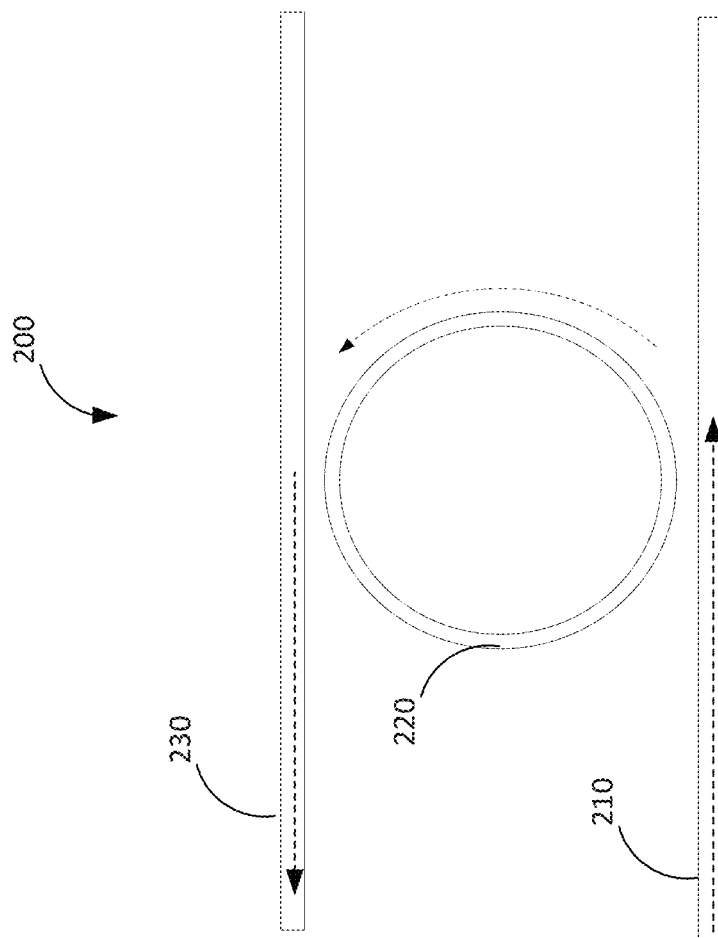
FIG. 2 illustrates an example of a photon-pair source.

FIG. 2 illustrates an example of a photon-pair source 200. Photon-pair source 200 may include a first waveguide 210, a ring resonator 220, and a second waveguide 230. Pumping light may travel in first waveguide 210 and may be coupled into ring resonator 220. Ring resonator 220 may include a waveguide loop such that a resonance for light having a certain wavelength may occur when the optical path length of the ring resonator is an integer number of the wavelength of the light. Ring resonator 220 may support multiple resonances at multiple wavelengths that may meet the resonance condition. The spacing between these resonances may be referred to as the free spectral range (FSR) and may depend on the optical path length of the ring resonator.

The ring resonator may include a nonlinear optical material, such as a second-order or third-order passive nonlinear optical medium (e.g., silicon, silicon nitride, silicon-rich silicon nitride, germanium compounds, silicon-rich germanium, chalcogenide glasses, organic compounds, PZT, BTO, lithium niobate, barium tantalate, or the like). Spontaneous four wave mixing (SFWM) or spontaneous parametric down-conversion (SPDC) process may occur in the ring resonator. In an SFWM process, two pump laser photons may be converted into a pair of daughter photons (e.g., signal and idler photons) in the nonlinear optical material. Due to energy conservation, the signal and idler photons generated may be at frequencies that are symmetrically distributed around the pump frequency. In general, due to such a spectral correlation, the heralded photons may be in a mixed state.

The signal and idler photon generated within ring resonator 220 may be coupled out of ring resonator 220 to second waveguide 230 at a certain coupling efficiency. The propagation directions of the photons in first waveguide 210, ring resonator 220, and second waveguide 230 may be as shown in FIG. 2.

Figure 3:
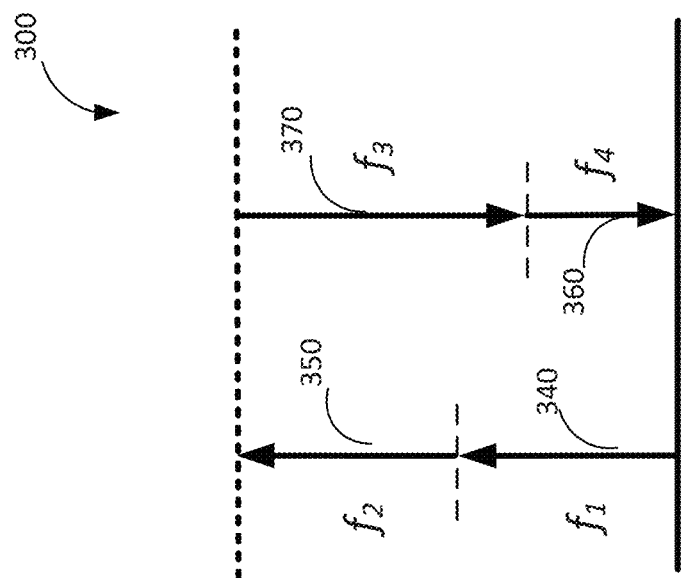
FIG. 3 illustrates an example of a spontaneous four wave mixing process in a photon-pair source.

FIG. 3 illustrates an example of a spontaneous four wave mixing process in a photon-pair source. A pump photon 340 at a first frequency $f1$ and a pump photon 350 at a second frequency $f2$ may be mixed to generate a pair of photons 360 and 370 with frequencies of $f3$ and $f4$, respectively. Pump photon 340 and pump photon 350 may have a same frequency or wavelength (i.e., $f1=f2$). Due to energy conservation, frequencies of $f3$ and $f4$ of photons 360 and 370 may be symmetrical with respect to the frequency of the pump photons in the spectrum (i.e., $|f3-f1|=|f1-f4|$).

In some embodiments, additional filtering may be added between the resonator and the waveguides. For example, in some embodiments, the coupling spectrum between the pump waveguide and the resonator and/or the coupling spectrum between the output waveguide and the resonator may be controlled or filtered using gratings or MZIs.

FIG. 4A is an example layout 400 of an example of a photon-pair source that may include a resonator ring 410 and a Mach Zehnder interferometer 420. Pump light may be injected from an input port 405 into a pump waveguide, and the output of the photon-pair source may be sent from output port 425 through an output waveguide. Resonator ring 410 and MZI 420 may be formed of waveguides that may be tuned (e.g., electrically or thermally) through operation of one or more electrodes 430. For example, electric fields may be applied to the waveguide material to change the optical property (e.g., refractive index) of the waveguide material, thus tuning resonator ring 410 and/or MZI 420. Resonator ring 410 may resonate at certain frequency and may cause the SFWM process to occur, thus generating the photon pairs as described above. When resonator ring 410 is tuned, the resonance condition may no longer be met and the resonance may not occur, and thus the photon-pair source may be turned off.

MZI 420 may be formed due to the coupling between the waveguide and the resonator ring at two points. MZI 420 may be used to add additional filtering for the coupling between the pump waveguide and the resonator and/or to add additional filtering for the coupling between the output waveguide and the resonator. For example, MZI 420 may be used to selectively couple the signal photon and the idler photon out of the resonator ring into the output waveguide, while preventing the pump photons from entering the output waveguide.

FIG. 4B is a diagram 450 illustrating the output spectrum of the photon-pair source shown in FIG. 4A. The horizontal axis represents the wavelength and the vertical axis represents the density of states of the photons at various wavelengths. As illustrated, the two generated photons 470 and 480 may have higher field enhancement than the pump photons 460 in the output. Photons 490 and 492 may also meet the resonant condition and thus may be generated in resonator ring 410, but may not be selected by MZI 420 and thus may not be coupled (with a sufficient high intensity) to output port 425.

As described above, when a photon pair is generated by the SFWM process, the two photons may be entangled (i.e., sharing a correlated joint spectral distribution), where the state of the photon pair may be a superposition of pairs of optical frequencies. When the photon pairs are entangled, the measurement of one photon (e.g., the signal photon) may cause the quantum state of the other photon (e.g., the idler photon) to collapse into one of several possible states, where each state may be a superposition of frequencies or, more specifically, an incoherent mixture of different single photon amplitudes. The collapse may occur with a probability that may depend on the initial amplitudes of the two photons. As such, each idler photon generated by the HPS may have a different frequency distribution. Thus, these idler photons may not be identical, which may cause difficulty in interfering (e.g., via the Hong-Ou-Mandel effect or any other single-photon interference phenomena) these idler photons (e.g., after different time delays) in, for example, a linear optic quantum computer.

In some photon-pair sources, spectral filtering of the generated photon pairs may be used to improve the spectral purity of the photons. However, the spectral filtering may reduce the number of photon pairs generated and the heralding efficiency of the source. In some other photon-pair sources, an HPS that includes one or more wavelength-dependent coupling regions in a resonator (e.g., implemented using MZIs) may achieve a higher spectral purity, but the brightness may be degraded.

According to certain embodiments, the pump resonance spectrum may be broadened to improve the purity of the output photons. Broadening the pump resonance spectrum may reduce the degree of correlation in the biphoton wave function (BWF) such that the biphoton wave function $\phi(\omega_s, \omega_i)$ (which depends on a function of the pump spectrum) can be fully separable into the wave function $\phi_S(\omega_s)$ of the signal photon and the wave function $\phi_I(\omega_i)$ of the idler photon (i.e., $\phi(\omega_s, \omega_i)=\phi_S(\omega_s)\phi_I(\omega_i)$), and thus the signal photons and idler photons are uncorrelated. This pump resonance spectrum broadening can be accomplished by using a sufficiently spectrally broad pump to reduce the strict correlation between the generated photon energies and the central frequency of the pump pulse. By using pump photons with a large spread in energy, photon pairs that are not strictly anti-correlated in their offsets from their respective resonances can be generated. Broadening the pump pulse spectrum can thus drastically reduce the degree of correlation in the BWF.

The spectrum of the pump photons available for conversion in the resonator is limited by the linewidth of the pump resonance, and thus may not be arbitrarily increased by broadening the injected pump, such as by pumping by using short laser pulses that may have a broad spectrum. Therefore, to achieve an uncorrelated BWF, the pump resonance linewidth must need to be significantly broader than the resonance linewidths of the signal and idler resonances. In other words, the quality factor of the pump resonance needs to be much smaller than the quality factors of the signal and idler resonances. Most existing resonator-based SFWM techniques use resonators with nearly equal resonance linewidths for the pump, signal, and idler photons, resulting in residual correlations between the signal and idler photons.

According to certain embodiments, two or more coupled resonators may be used in a photon-pair source to generate photon pairs with both a high spectral purity and a high brightness (or low pump power). In one embodiment, the photon-pair source may include a pump resonator (e.g., a ring resonator) and a photon-pair resonator (e.g., a ring or disk resonator). The pump resonator and photon-pair resonator may have different sizes with different resonance spectra and free spectrum ranges, but may be aligned around one frequency. The pump resonator and photon-pair resonator may be independently trimmed or tuned to have different resonance and coupling characteristics. For example, the pump resonance ring can have a lower quality factor (and a wider resonant linewidth) than the photon-pair resonator, and thus may have a broader pump resonance spectrum. Furthermore, when coupled, the pump resonator and the photon-pair resonator can cause coupling-induced resonance splitting, thus further broadening the pump spectrum. The coupling-induced resonance splitting may be caused by the excitation of a resonant mode of a first resonator due to the index perturbation caused by a second resonator closely coupled to the first resonator, with a temporal phase shift such that its resonant frequency is modified. The shift can be negative or positive and can be adjusted by changing the configuration of the two coupled resonators. The purity of the photons generated by the photon-pair source can be improved due to the broadening of the pump resonance spectrum, without affecting the brightness of the photons.

In some embodiments, the pump resonator and the photon-pair resonator may be independently and dynamically tuned or switched. In some embodiments, the pump resonator may be detuned to turn off an HPS in a set of multiplexed or cascaded HPSes, which may leave the photon-pair resonator of the HPS unaffected and transparent to photons from other HPSes traveling through the photon-pair resonator. The multiple resonators may also allow the pump and signal/idler photons to travel in the same direction to make the layout more favorable.

Figure 5B:
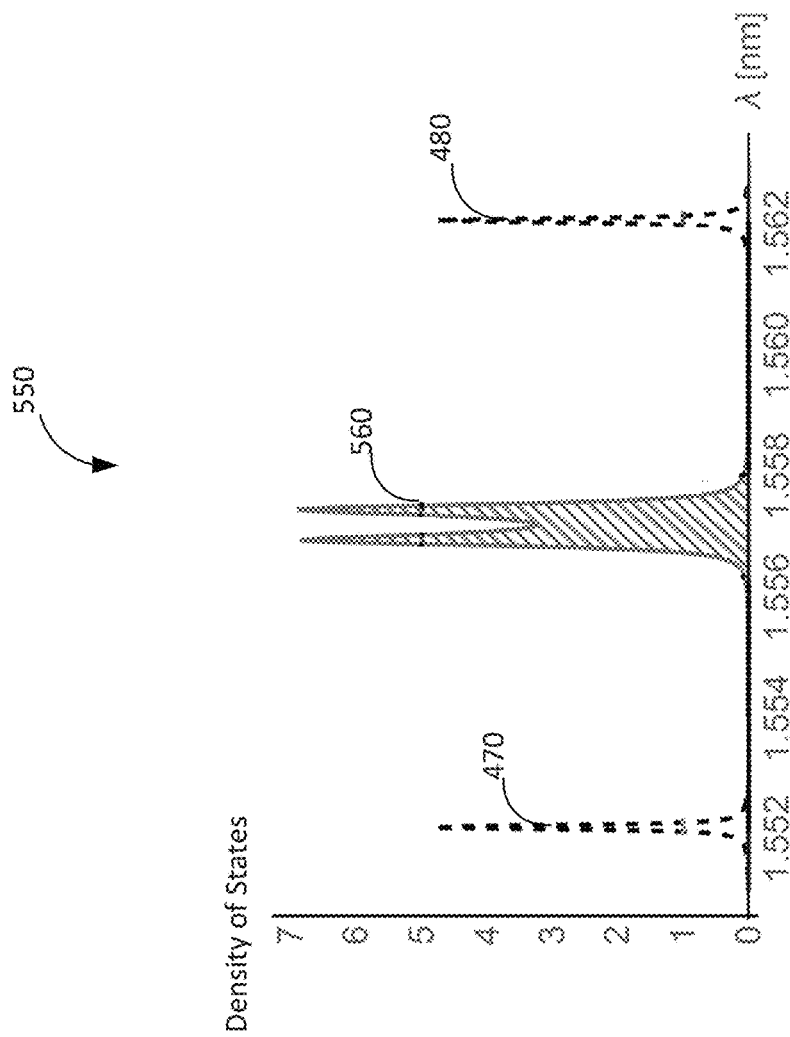
FIG. 5B is a diagram illustrating the characteristic spectra of the photon-pair source shown in FIG. 5A according to certain embodiments.
Figure 5A:
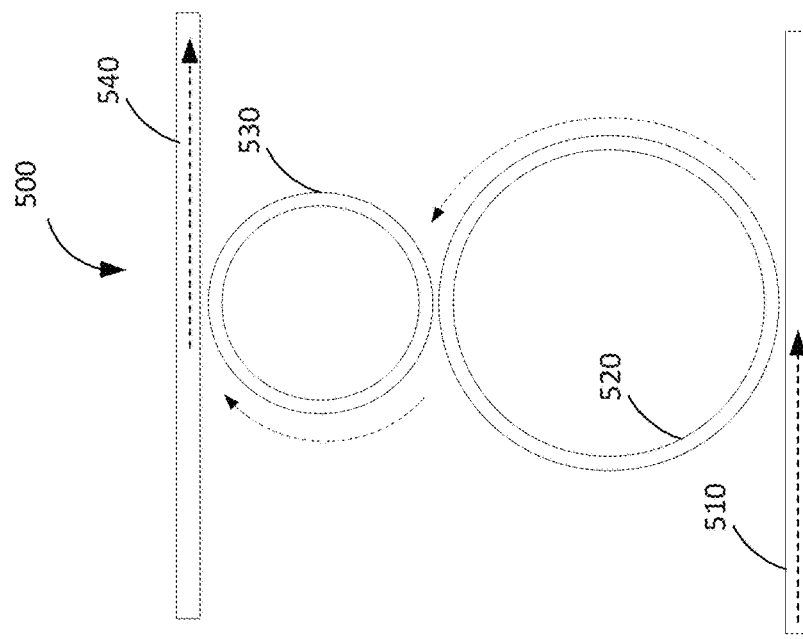
FIG. 5A illustrates an example of a photon-pair source including two or more coupled ring resonators according to certain embodiments.

FIG. 5A illustrates an example of a photon-pair source 500 including two or more coupled ring resonators according to certain embodiments. As shown, photon-pair source 500 may include a first waveguide 510 (e.g., a pump waveguide), a pump resonator 520, a photon-pair resonator 530, and a second waveguide 540 (e.g., an output waveguide). Pump photons may travel in first waveguide 510 and may be coupled into pump resonator 520. For example, a short laser pulse (which may thus have a wide spectrum in the frequency domain due to the short duration in time domain) may be injected as the pump light into first waveguide 510. Pump resonator 520 may include a waveguide loop with an optical path length that is an integer multiple of the wavelength of the pump photons, such that pump photons may resonate in pump resonator 520. Pump resonator 520 may have a low quality factor, and thus may have a wide resonance linewidth. Therefore, a wider band of the pump light may be coupled into pump resonator 520 and propagate with pump resonator 520.

Photon-pair resonator 530 may be coupled to pump resonator 520 as shown in the figure and may include a waveguide loop with an optical path length that is an integer multiple of the wavelength of the signal photon and an integer multiple of the wavelength of the idler photon, such that both the signal photon and the idler photon may resonate in photon-pair resonator 530. Pump photons may also resonate in photon-pair resonator 530, where the SFWM process may occur to generate the photon pair. Photon-pair resonator 530 may have a high quality factor and thus narrow resonance linewidths for the signal and idler photons. Therefore, the signal and idler photons may have a higher spectral purity. Photon-pair resonator 530 may be coupled to second waveguide 540 to couple generated photon pairs to the output waveguide.

As shown in FIG. 5A, the propagation direction of the pump photons in first waveguide 510 and the propagation direction of the photon pairs in second waveguide 540 may be the same due to the two coupled ring resonators between first waveguide 510 and second waveguide 540. In addition, the first waveguide 510 and the second waveguide 540 can be parallel to each other such the first waveguide 510 may serve as a pump bus waveguide and the second wave guide 540 may serve as an output photon bus. Such an arrangement can be advantageous to provide a simpler and more compact layout that can be manufactured more easily than other designs.

In addition, the coupling between photon-pair resonator 530 and pump resonator 520 may cause coupling-induced resonance splitting, and thus may further broaden the pump resonance spectrum.

FIG. 5B is a diagram 550 illustrating the characteristic spectra of photon-pair source 500 shown in FIG. 5A according to certain embodiments. The horizontal axis represents photon wavelength and the vertical axis represents the density of states of the photons at various wavelengths. As illustrated, the resonance spectrum of the pump resonator (and thus the spectrum of the pump photons 560) may be broadened due to the coupling-induced resonance splitting. The resonance linewidth of photon-pair resonator (and thus the spectra of the generated photons 470 and 480) may be narrow and thus the generated photons may have a higher spectral purity.

Figure 6B:
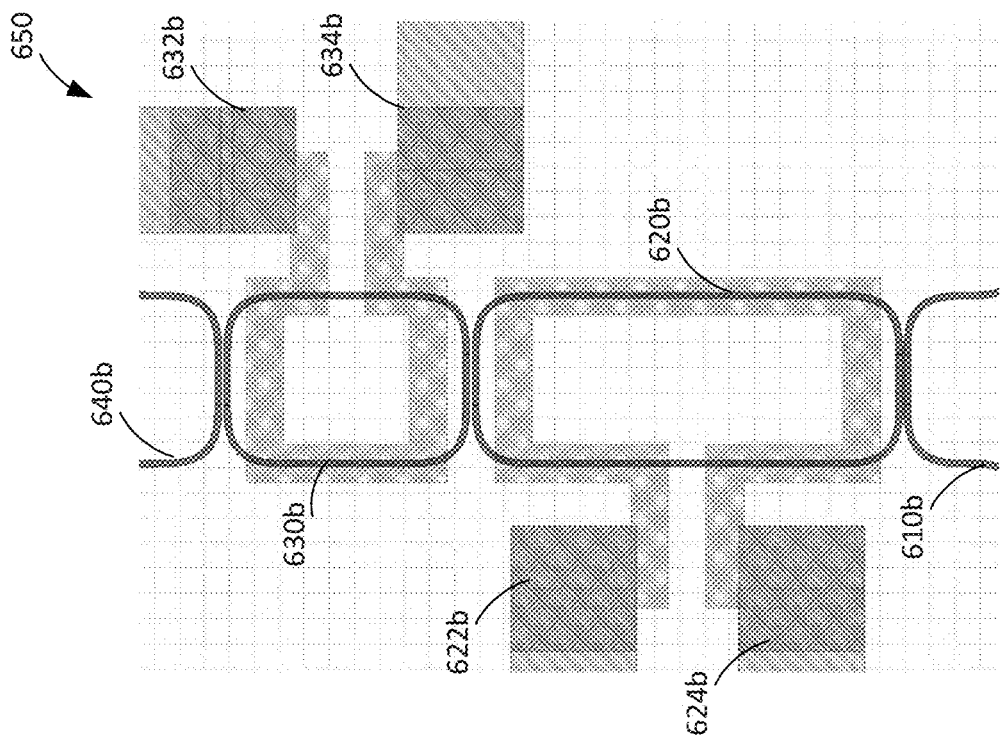
FIG. 6B is an example layout of another example of a photon-pair source that includes two coupled resonator rings according to certain embodiments.
Figure 6A:
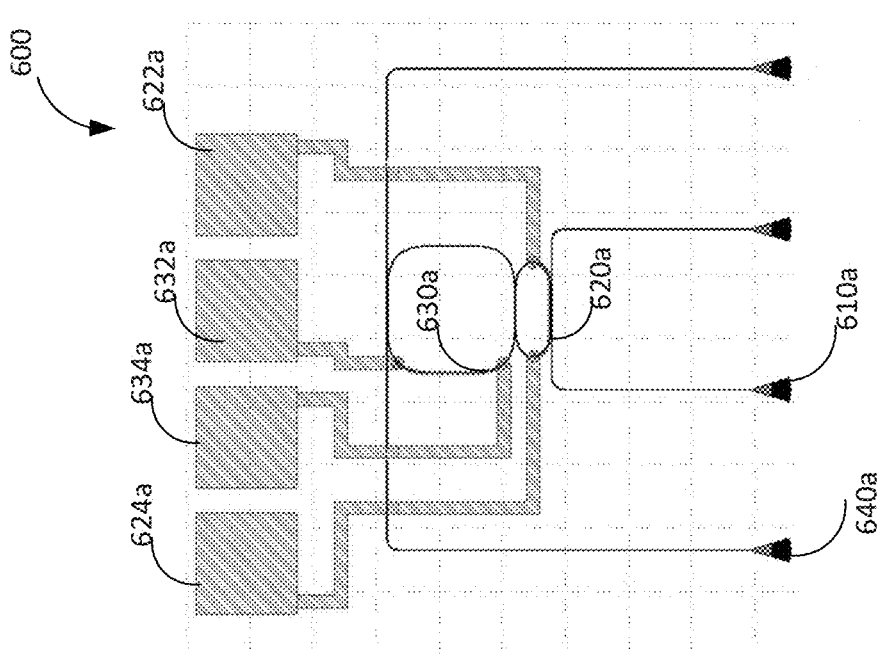
FIG. 6A is an example layout of an example of a photon-pair source that includes two coupled resonator rings according to certain embodiments.

FIG. 6A is an example layout of an example of a photon-pair source 600 that may include two coupled resonator rings according to certain embodiments. Photon-pair source 600 may include a pump waveguide 610a and an output waveguide 640a (which may also be referred to as a pump bus and a signal bus), which may be coupled to a pump ring 620a and a photon-pair ring 630a, respectively. Pump waveguide 610a, output waveguide 640a, pump ring 620a, and photon-pair ring 630a may be similar to first waveguide 510, second waveguide 540, pump resonator 520, and photon-pair resonator 530 described above. A first tuner may include electrodes 622a and 624a and may be used to tune at least a portion of pump ring 620a. A second tuner may include electrodes 632a and 634a and may be used to tune at least a portion of photon-pair ring 630a. The tuners may tune pump ring 620a or photon-pair ring 630a, for example, by changing the refractive index of the materials of the waveguide in pump ring 620a or photon-pair ring 630a electro-optically or thermally. In some embodiments, an electrical field may be applied to the waveguide by applying a voltage signal on two electrodes to change the refractive index of the materials of the waveguide. In some embodiments, a current may be applied to the materials of the waveguide by applying a voltage signal on two electrodes to inject or deplete carriers and thus change the refractive index of the materials of the waveguide. When pump ring 620a or photon-pair ring 630a is tuned, the overall optical path length of pump ring 620a or photon-pair ring 630a may change due to the refractive index change. Thus, the resonance condition may no longer be met for the photons or the resonant frequency may be shifted, and hence the resonance or coupling may not occur. Thus, the photon-pair source may be turned off. In some embodiments, the resonance may still occur but the resonant frequency may be changed.

FIG. 6B is an example layout of another example of a photon-pair source 650 that may include two coupled resonator rings according to certain embodiments. Photon-pair source 650 may include a pump waveguide 610b and an output waveguide 640b, which may be coupled to a pump ring 620b and a photon-pair ring 630b, respectively. A first tuner may include electrodes 622b and 624b and may be used to tune at least a portion of pump ring 620b. A second tuner may include electrodes 632b and 634b and may be used to tune at least a portion of photon-pair ring 630b. The tuners may tune pump ring 620b or photon-pair ring 630b, for example, by changing the refractive index of the materials of the waveguide in pump ring 620b or photon-pair ring 630b electro-optically or thermally, as described above with respect to FIG. 6A.

Figure 7A:
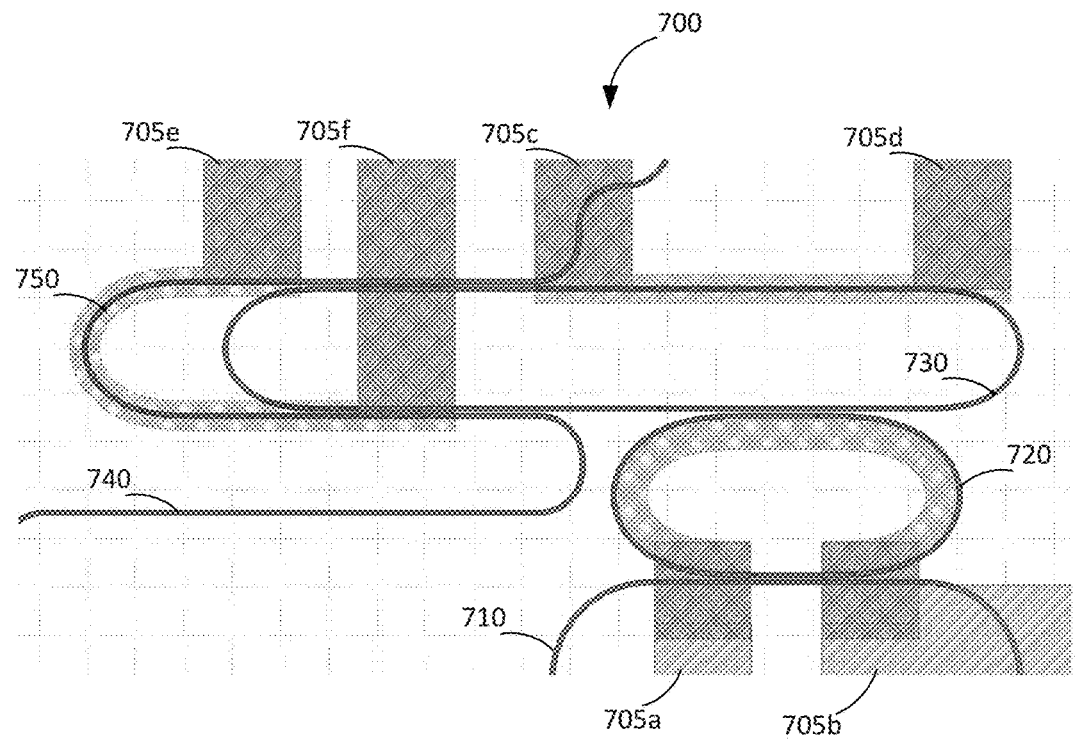
FIG. 7A illustrates a layout of an example of a photon-pair source including two or more coupled ring resonators and an asymmetrical MZI according to certain embodiments.

FIG. 7A illustrates a layout of an example of a photon-pair source 700 including two or more coupled ring resonators and an asymmetrical MZI according to certain embodiments. Photon-pair source 700 may include a pump waveguide 710 and an output waveguide 740, which may be coupled to a pump ring 720 and a photon-pair ring 730, respectively. Pump waveguide 710, output waveguide 740, pump ring 720, and photon-pair ring 730 may be similar to first waveguide 510, second waveguide 540, pump resonator 520, and photon-pair resonator 530 described above. Electrodes 705 may be used to tune pump ring 720 and photon-pair ring 730, for example, electro-optically or electro-thermally.

In addition, an MZI 750 may be formed between output waveguide 740 and photon-pair ring 730 due to the coupling between output waveguide 740 and photon-pair ring 730 at two regions. As described above with respect to MZI 420 of FIG. 4A, MZI 750 may be asymmetrically and may be used to filter photons that may be coupled from photon-pair ring 730 to output waveguide 740. A first tuner may include electrodes 705a and 705b and may be used to tune at least a portion of pump ring 720. A second tuner may include electrodes 705c and 705d and may be used to tune at least a portion of photon-pair ring 730. A third tuner may include electrodes 705e and 705f and may be used to tune at least a portion of MZI 750. The tuners may tune pump ring 720, photon-pair ring 730, and MZI 750, for example, by changing the refractive indexes of the materials of the waveguides in pump ring 720, photon-pair ring 730, and MZI 750 electro-optically or thermally, as described above with respect to FIG. 6A.

In FIG. 7A, pump ring 720 and photon-pair ring 730 may be elongated and may be offset with respect to each other in the elongating direction. For example, pump ring 720 and photon-pair ring 730 may be in the shape of a racetrack. Pump ring 720 and photon-pair ring 730 may be coupled along the elongating direction. MZI 750 may be coupled to photon-pair ring 730 along the elongating direction as well. Thus, the coupling regions can be made longer and the gaps between the waveguides in the coupling regions can be made larger to facilitate the fabrication.

Figure 7B:
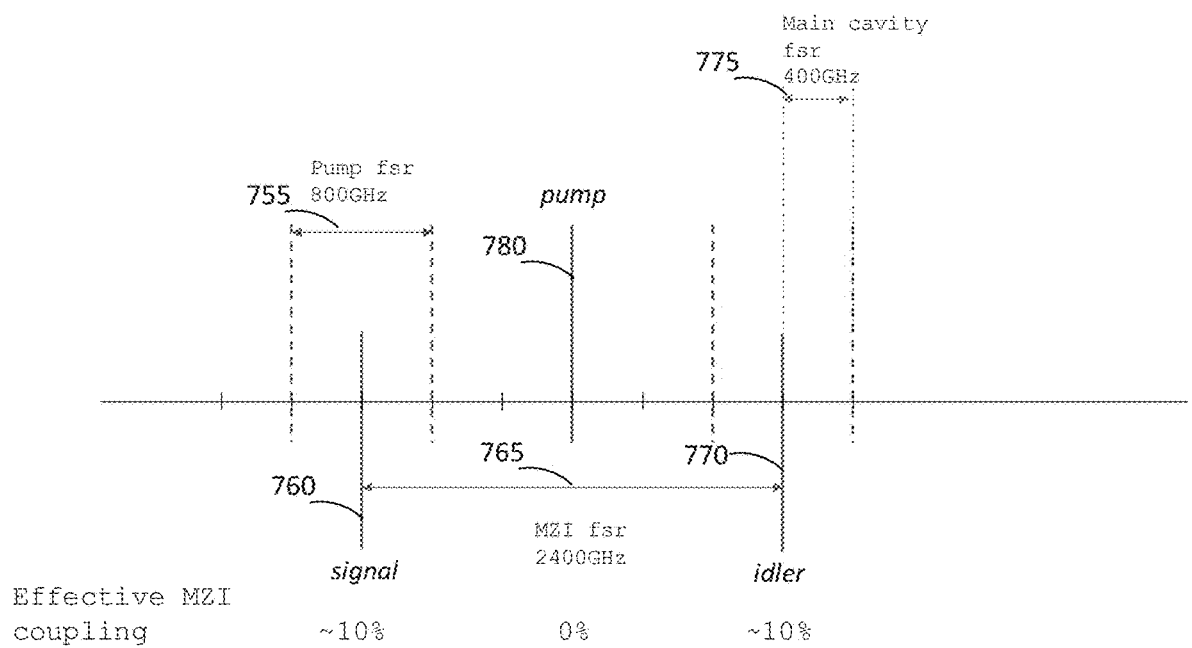
FIG. 7B illustrates an example of spectrum alignment in the photon-pair source of FIG. 7A according to certain embodiments.

FIG. 7B illustrates an example of spectrum alignment in photon-pair source 700 of FIG. 7A according to certain embodiments. FIG. 7B shows the frequency of pump photon 780 and FSR 755 of pump ring 720, which may be 800 GHz in the example. FIG. 7B also shows the frequency of signal photon 760, frequency of idler photon 770, and FSR 775 of photon-pair ring 730, which may be 400 GHz in the example. FIG. 7B also shows the FSR 765 of MZI 750, which may be 2400 GHz in the example. The coupling between MZI 750 and output waveguide 740 due to MZI 750 may be 10%.

Figure 8B:
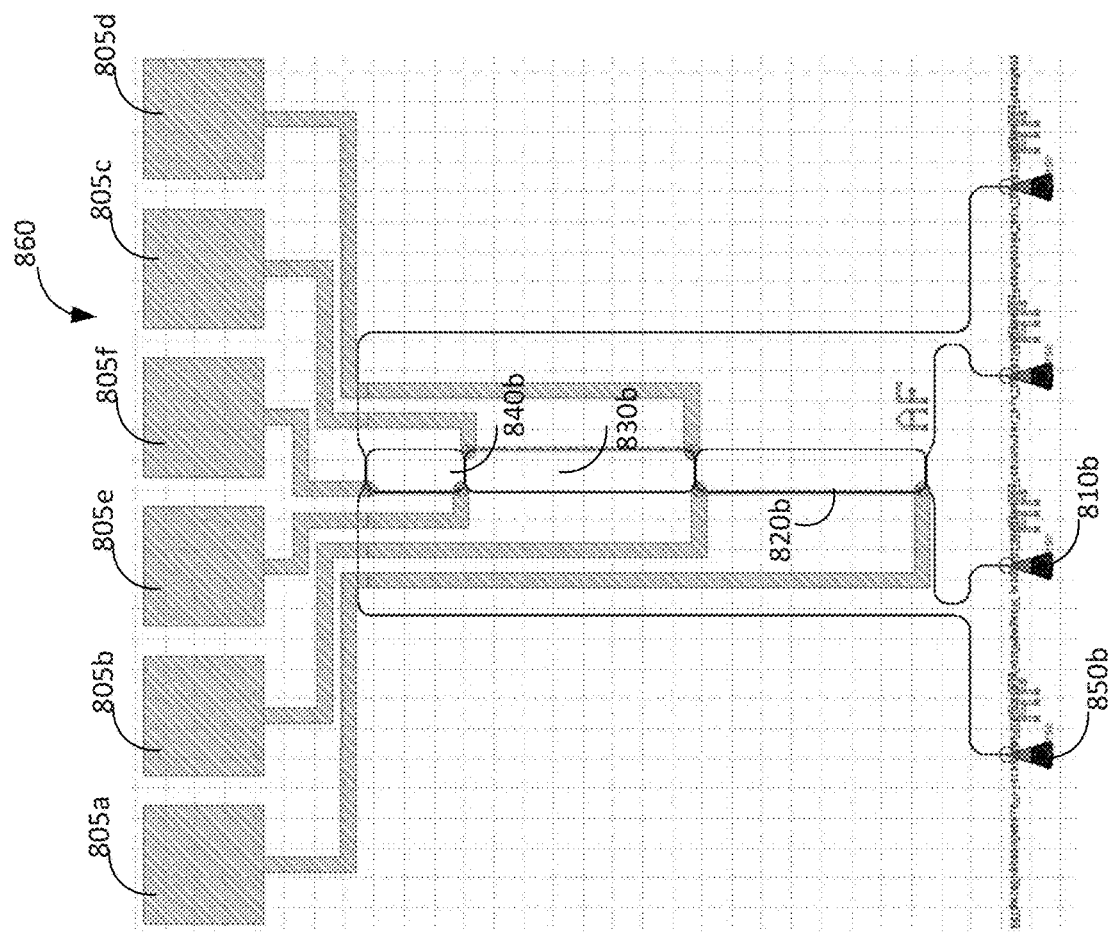
FIG. 8B illustrates an example of a layout for the photon-pair source of FIG. 8A according to certain embodiments.
Figure 8A:
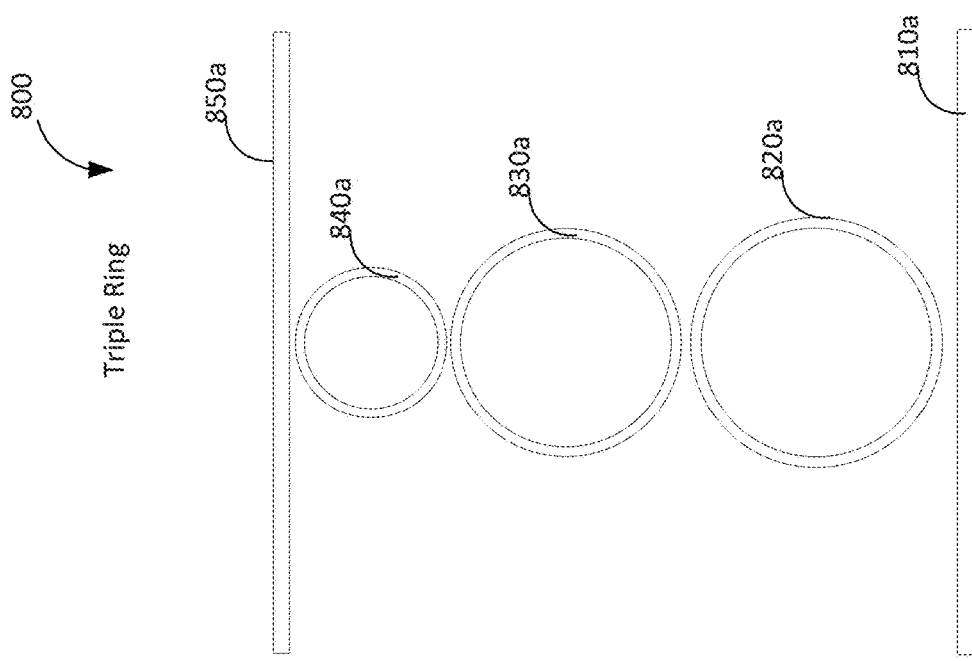
FIG. 8A illustrates another example of a photon-pair source that includes three coupled rings according to certain embodiments.

FIG. 8A illustrates another example of a photon-pair source 800 that may include three coupled rings according to certain embodiments. Photon-pair source 800 may include a pump waveguide 810a and an output waveguide 850a, which may be coupled to a pump ring 820a and a photon-pair ring 840a, respectively. Pump ring 820a may be configured such that only pump photons may resonate in it. Pump ring 820a may have a low quality factor and thus a wide resonant linewidth for pump photons. Photon-pair ring 840a may be configured such that signal and idler photons may resonate in it, while pump photons may not resonate within photon-pair ring 840a. Photon-pair ring 840a may have a high quality factor and thus a narrow resonant linewidth for signal and idler photons. A main resonator 830a may be coupled to both pump ring 820a and photon-pair ring 840a, and may cause resonance for the pump photons, signal photons, and idler photons. The SFWM process may occur in main resonator 830a. Thus, pump photons may be coupled into pump ring 820a from pump waveguide 810a, and then coupled to main resonator 830a to generate the photon pairs. The photon pairs may be selectively coupled to photon-pair ring 840a and then to output waveguide 850a, while the pump photons may be filtered out and may not enter photon-pair ring 840a or output waveguide 850a.

FIG. 8B illustrates an example of a layout 860 for photon-pair source 800 according to certain embodiments. The layout may include a pump waveguide 810b (which may correspond to pump waveguide 810a), an output waveguide 850b (which may correspond to output waveguide 850a), a pump ring 820b (which may correspond to pump ring 820a), a main resonator 830b (which may correspond to main resonator 830a), and a photon-pair ring 840b (which may correspond to photon-pair ring 840a). A first tuner may include electrodes 805a and 805b and may be used to tune at least a portion of pump ring 820b. A second tuner may include electrodes 805c and 805d and may be used to tune at least a portion of main resonator 830b. A third tuner may include electrodes 805e and 805f and may be used to tune at least a portion of photon-pair ring 840b. The tuners may tune pump ring 820b, main resonator 830b, and photon-pair ring 840b, for example, by changing the refractive indexes of the materials of the waveguides in pump ring 820b, main resonator 830b, and photon-pair ring 840b electro-optically or thermally, as described above with respect to FIG. 6A.

FIG. 9A shows an example of a photon-pair source 900a according to certain embodiments. Photon-pair source 900a may include two coupled rings, such as pump ring 920a and photon-pair ring 930a that are coupled to pump and output waveguides 910a and 940a through MZIs 912a and 942a, respectively. MZIs 912a and 942a may be used to filter the pump photons and the signal and idler photons.

FIG. 9B illustrates an example of a layout 900b for photon-pair source 900a of FIG. 9A according to certain embodiments. Layout 900b of photon-pair source 900a may include two coupled rings, such as pump ring 920b and photon-pair ring 930b that are coupled to pump and output waveguides 910b and 940b through MZIs 912b and 942b, respectively. MZIs 912b and 942b may be used to filter the pump photons and the signal and idler photons. A first tuner may include electrodes 905a and 905b and may be used to tune at least a portion of MZI 912b. A second tuner may include electrodes 905c and 905d and may be used to tune at least a portion of pump ring 920b. A third tuner may include electrodes 905e and 905f and may be used to tune at least a portion of photon-pair ring 930b. A fourth tuner may include electrodes 905g and 905h and may be used to tune at least a portion of MZI 942b. The tuners may tune MZI 912b, pump ring 920b, photon-pair ring 930b, and MZI 942b, for example, by changing the refractive indexes of the materials of the waveguides in MZI 912b, pump ring 920b, photon-pair ring 930b, and MZI 942b electro-optically or thermally, as described above with respect to FIG. 6A.

Layout 900b uses only one type of Euler bend and one type of coupling region, which may facilitate the design and the simulation of the photon-pair source. The four tuners can be fit in the layout without overlapping with a coupling region, which may reduce the effect of changing the phase in the waveguides on the coupling between waveguides. The MZIs may be compact but may still have sufficiently long portions to be tuned by tuners. In addition, the lengths of the waveguides coupled together may be relatively long (e.g., each greater than a respective threshold value) and thus the gaps between the coupled waveguides may be larger and may still achieve the same coupling efficiencies. As such, the waveguides may be easy to fabricate and may be more tolerant to fabrication process variations.

FIG. 9C shows an example of a photon-pair source 950 according to certain embodiments. Photon-pair source 950 may include three coupled rings 970, 980, and 990 and an MZI 994. Ring 970 may be coupled to a pump waveguide 960, and ring 990 may be coupled to an output waveguide 992 through MZI 994.

Figure 10B:
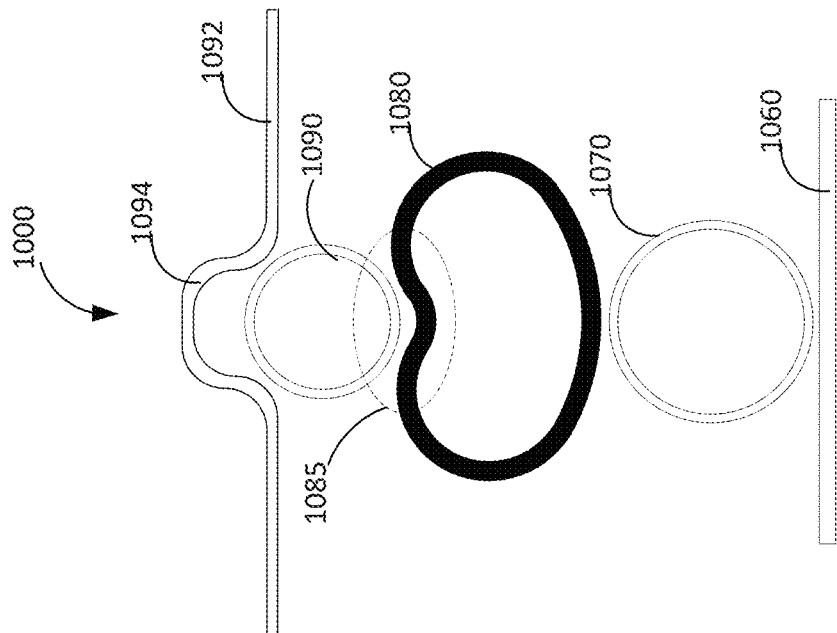
FIG. 10B illustrates an example of a photon-pair source according to certain embodiments.
Figure 10A:
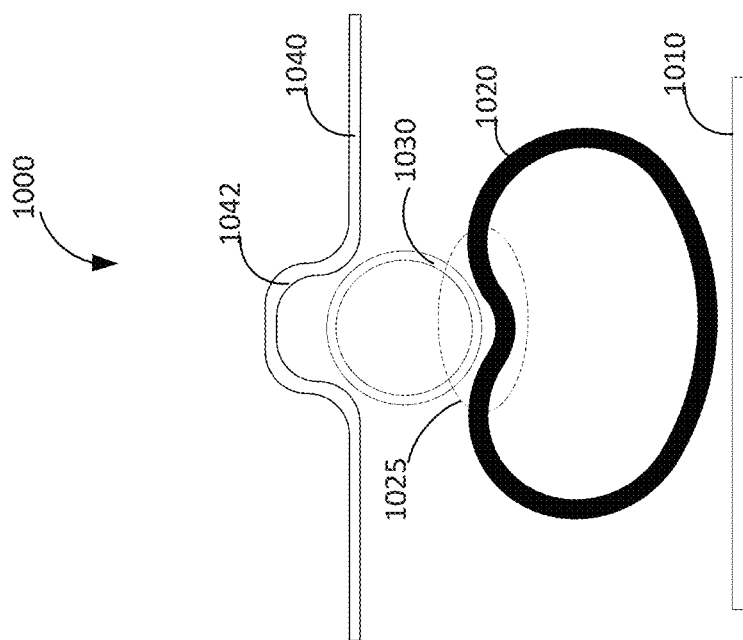
FIG. 10A illustrates an example of a photon-pair source according to certain embodiments.

FIG. 10A illustrates an example of a photon-pair source 1000 that may include two coupled resonator rings 1020 and 1030 and two MZIs 1025 and 1042 according to certain embodiments. Resonator ring 1020 may be coupled to a pump waveguide 1010. Resonator ring 1030 may be coupled to an output waveguide 1040 through MZI 1042. In photon-pair source 1000, resonator ring 1020 may be a modified resonator ring that may have a concave shape such that resonator rings 1020 and 1030 may be coupled at two regions and thus MZI 1025 may be formed between resonator rings 1020 and 1030 as an additional filter.

FIG. 10B shows an example of a photon-pair source 1050 that may include three coupled resonator rings 1070, 1080, and 1090 and two MZIs 1094 and 1085 according to certain embodiments. Resonator ring 1070 may be coupled to a pump waveguide 1060. Resonator ring 1090 may be coupled to an output waveguide 1092 through MZI 1094. Resonator ring 1080 may be a modified resonator ring that may have a concave shape such that resonator ring 1090 may be coupled to resonator ring 1080 at two regions and thus MZI 1085 may be formed between resonator rings 1080 and 1090 as an additional filter.

Figure 11A:
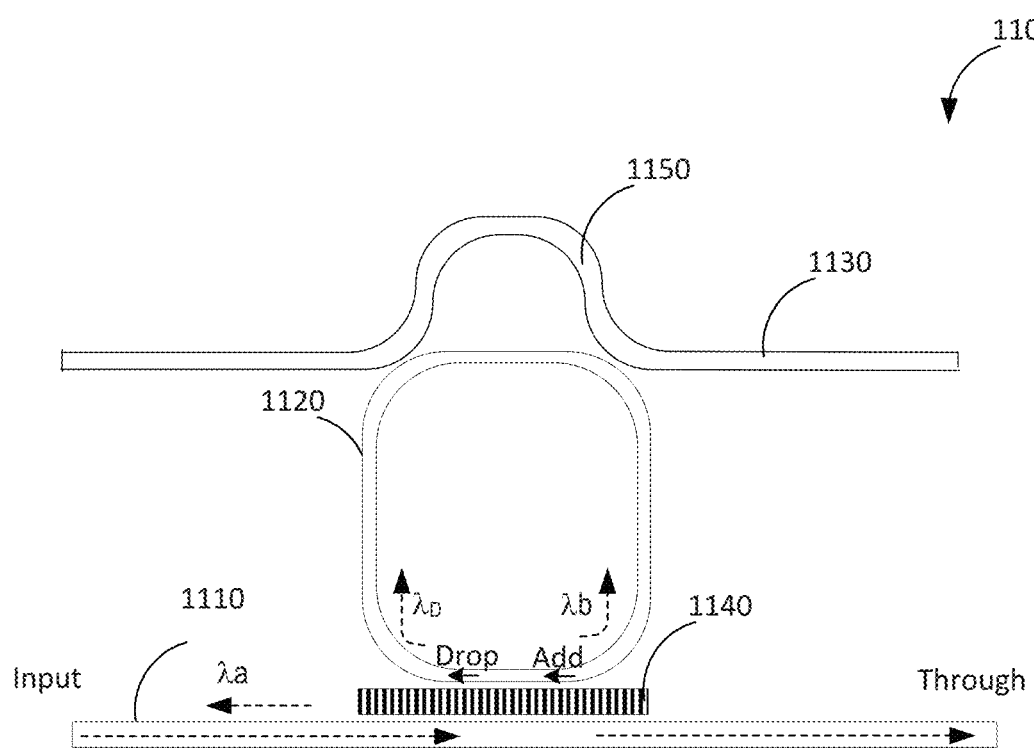
FIG. 11A illustrates an example of a photon-pair source according to certain embodiments.

FIG. 11A illustrates an example of a photon-pair source 1100 that includes a grating coupler 1140 according to certain embodiments. As described above, photon-pair source 1100 may include a pump waveguide 1110, one or more resonator rings 1120, and an output waveguide 1130, which may each include a waveguide. In the example, grating coupler 1140 may be positioned between pump waveguide 1110 and a resonator ring 1120, and may cause contra-directional coupling between pump waveguide 1110 and resonator ring 1120. For example, if the grating period of grating coupler 1140 is $\Lambda$, the refractive index of pump waveguide 1110 is $n_a$, and the refractive index of resonator ring 1120 is $n_b$, the contra-directional coupling may occur at a wavelength $\lambda_D = (n_a + n_b) \times \Lambda$. Grating coupler 1140 may also cause photons at a wavelength $\lambda_a = 2n_a \times \Lambda$ in pump waveguide 1110 to be reflected back, and may cause photons at a wavelength $\lambda_b = 2n_b \times \Lambda$ in resonator ring 1120 to be reflected back.

In some embodiments, pump waveguide 1110, resonator ring 1120, and grating coupler 1140 may be designed such that photons at wavelengths $\lambda_a$, $\lambda_b$, and $\lambda_D$ may resonate within resonator ring 1120, photons at wavelength $\lambda_D$ may be contra-directionally reflected and coupled into resonator 1120 from pump waveguide 1110, photons at wavelength $\lambda_a$ may be reflected back within pump waveguide 1110, photons at wavelength $\lambda_b$ may be reflected back within resonator ring 1120, and $\lambda_a$ and $\lambda_b$ may be symmetrical with respect to $\lambda_D$. Grating coupler 1140 may also be configured to have a broad coupling band near wavelength $\lambda_D$ for pump photons. As such, photons in the broad coupling band near wavelength $\lambda_D$ may be coupled as the pump photons into resonator ring 1120. Photons at wavelengths $\lambda_a$ and $\lambda_b$ may be the photon pairs generated within resonator ring 1120, and may be coupled out of resonator ring 1120 into output waveguide 1130, for example, through an MZI 1150. Neither photons at wavelength $\lambda_a$ nor photons at wavelength $\lambda_b$ may be coupled back to pump waveguide 1110 due to the reflection.

Figure 11B:
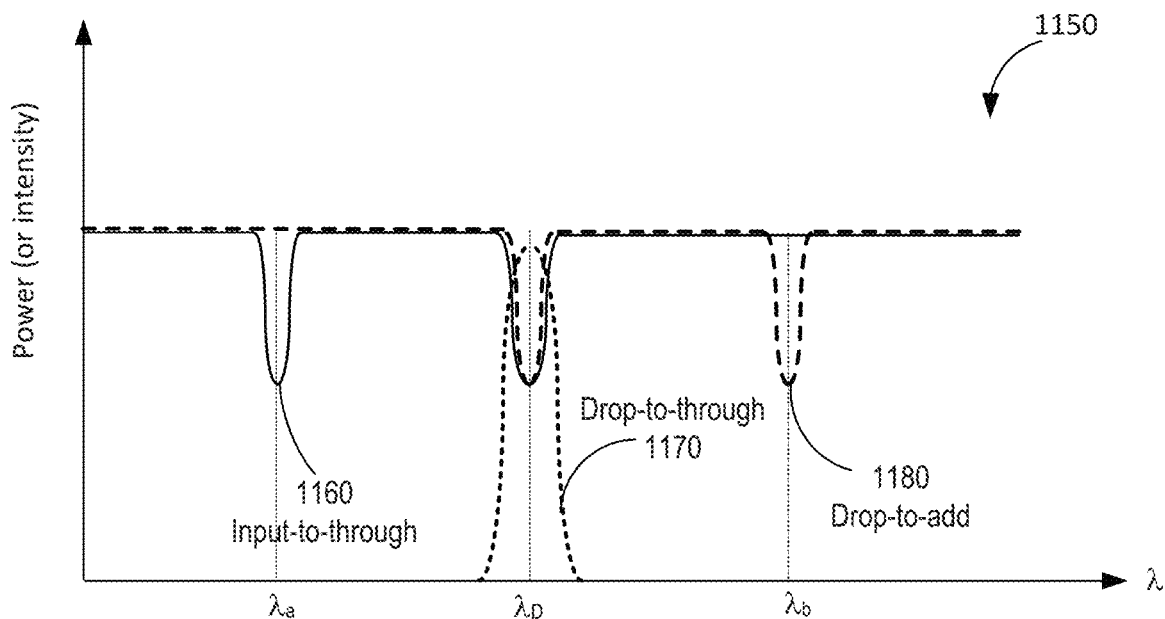
FIG. 11B illustrates the spectrum of light on different paths in the photon-pair source shown in FIG. 11A according to certain embodiments.

FIG. 11B illustrates the spectrum of light on different paths in the photon-pair source 1100 shown in FIG. 11A according to certain embodiments. As shown by an input-to-through curve 1160, photons at wavelength $\lambda_a$ in pump waveguide 1110 may be reflected back, and pump photons at wavelength $\lambda_D$ may be coupled from pump waveguide 1110 into resonator ring 1120, and thus there may be a dip at wavelength $\lambda_a$ and a dip at wavelength $\lambda_D$ in the spectrum of light from the input ("input") of pump waveguide 1110 to the output ("through") of pump waveguide 1110. Pump photons at wavelength $\lambda_D$ in resonator ring 1120 may be coupled from resonator ring 1120 back into pump waveguide 1110 towards the output ("through") of pump waveguide 1130 due to contra-directional coupling caused by grating coupler 1140, and thus there may be a pulse at wavelength $\lambda_D$ in the spectrum of light from resonator ring 1120 to pump waveguide 1110 as shown by a drop-to-through curve 1170. In addition, photons at wavelength $\lambda_b$ in resonator ring 1120 may be reflected back in resonator ring 1120. Therefore, there may be a dip at wavelength $\lambda_D$ and a dip at wavelength $\lambda_b$ in the spectrum of light in resonator ring 1120 in the clockwise direction (as indicated by a drop-to add curve 1180).

Figure 12:
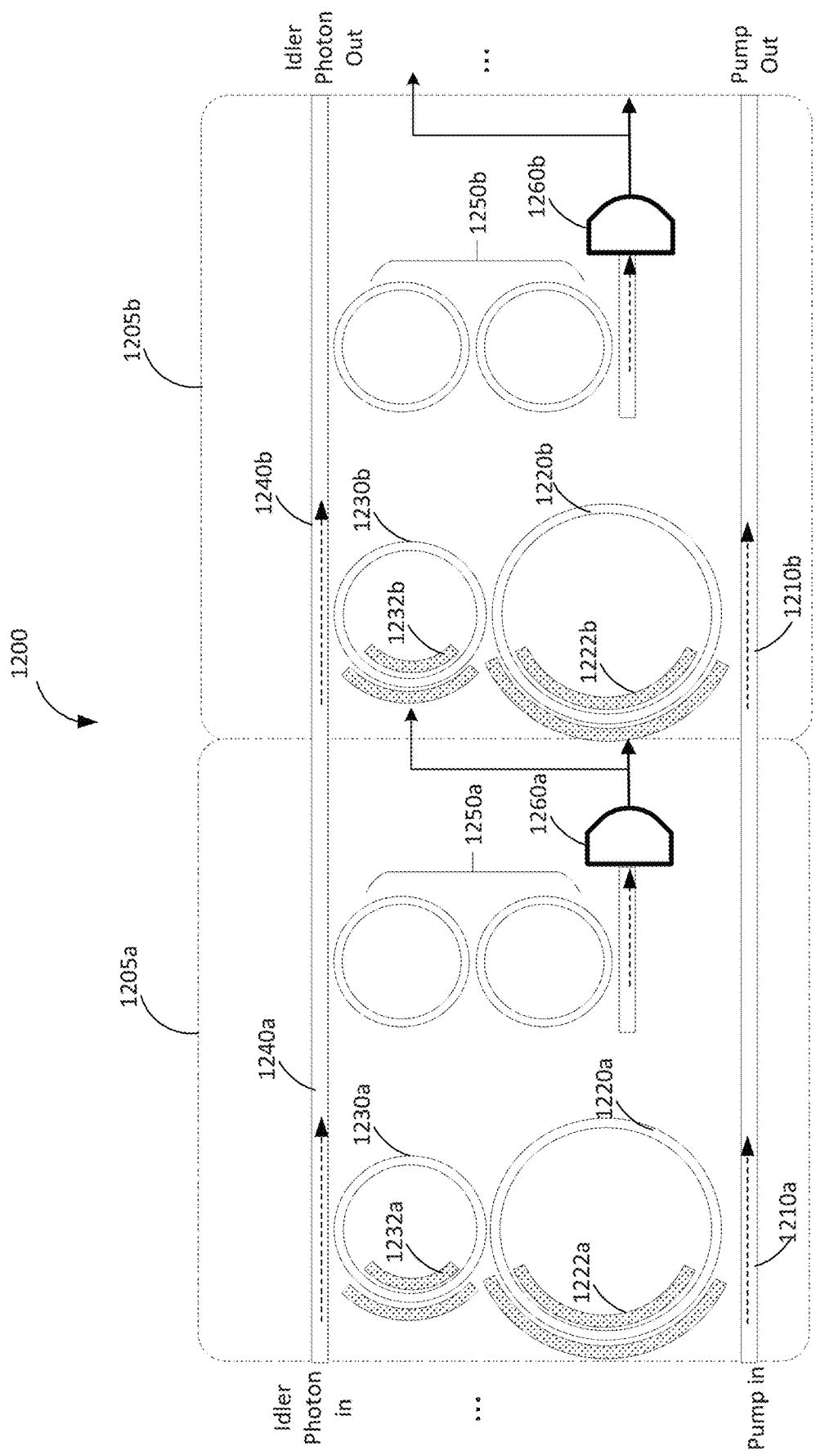
FIG. 12 illustrates an example of a single-photon source that includes a set of cascaded or multiplexed heralded photon sources according to certain embodiments.

FIG. 12 illustrates an example of a single-photon source 1200 that may include a set of cascaded or multiplexed heralded photon sources according to certain embodiments. Single-photon source 1200 may be an example of single-photon source 100 of FIG. 1 described above. Single-photon source 1200 may include multiple heralded photon sources 1205a, 1205b, and the like, which may be collectively referred to as HPSes 1205. Each HPS 1205 may include a photon-pair source as described above with respect to FIGS. 5A-11A. For example, as illustrated in FIG. 12, the photon-pair source in each heralded photon source (e.g., HPS 1205a or 1205b) may include a pump waveguide (e.g., pump waveguide 1210a or 1210b), a pump resonator (e.g., pump resonator 1220a or 1220b), a photon-pair resonator (e.g., photon-pair resonator 1230a or 1230b), and an output waveguide (e.g., output waveguide 1240a or 1240b). At least a portion of each pump resonator (e.g., pump resonator 1220a or 1220b) may be tuned by a tuner (e.g., tuner 1222a or 1222b) as described above. In some embodiments, at least a portion of each photon-pair resonator (e.g., photon-pair resonator 1230a or 1230b) may also be tuned by a tuner (e.g., tuner 1232a or 1232b) as described above. Each photon-pair source may be configurable to generate pairs of photons (each including a signal photon and an idler photon) based on, for example, SFWM. The pairs of photons may be coupled from the photon-pair resonator (e.g., photon-pair resonator 1230a or 1230b) to the output waveguide (e.g., output waveguide 1240a or 1240b).

Each pair of photons may be split by a splitter, such as, for example, a wavelength division demultiplexing (WDDM) device to two different output channels based on their different wavelengths. In the example shown in FIG. 12, the WDDM device (e.g., WDDM device 1250a or 1250b) may include one or more resonator rings, which may selectively couple one photon (e.g., the signal photon) at a particular wavelength range to an output channel connected to a single photon detector (SPD) (e.g., SPD 1260a or 1260b), and keep the idler photon in the output waveguide (e.g., output waveguide 1240a or 1240b). In some embodiments, the WDDM device (e.g., WDDM device 1250a or 1250b) may also be tunable by a tuner (not shown in FIG. 12) to tune the one or more resonator rings, and thus tune the wavelength selectivity of the WDDM device.

If a signal photon is detected by the SPD (e.g., SPD 1260a), a corresponding idler photon would exist in the output waveguide, and thus can be used as the output of the single-photon source. The detection of the signal photon by the SPD (e.g., SPD 1260a) can cause the tuner(s) in the subsequent HPSes (e.g., tuner 1222b or 1232b of HPS 1205b) to be tuned such that the subsequent photon-pair sources can be switched off or bypassed and would not generate photon pairs. For example, pump resonator 1220b may be tuned to reduce the coupling of the pump photons into pump resonator 1220b and/or photon-pair resonator 1230b, such that no photon-pair may be generated in HPS 1205b. The idler photon generated at HPS 1205a may pass through output waveguide 1240b (and may not be coupled into photon-pair resonator 1230b when tuner 1232b is tuned) of HPS 1205b and become the idler photon output for HPS 1205b and the output photon for single-photon source 1200.

Thus, while each HPS 1205 may produce a heralded photon non-deterministically for a given pump pulse, one or more pump pulses can travel down the pump waveguide (e.g., 1210a, 1210b, etc.) and can drive several different HPSes to improve the probability that a heralded single photon is deterministically generated by single-photon source 1200. For example, a pump pulse could travel along a series of HPSes as arranged in FIG. 12, such as a series of 10 HPSes. As the pump pulse travels down the pump waveguide, a heralded single photon may not be created by the first 5 HPSes (i.e., the first 5 HPSes generate zero photons), but then a heralded single photon may be generated at the sixth HPS. A detection signal from the SPD associated with the sixth HPS is then used to tune the remaining HPSes such that they do not produce any additional photons, thereby improving the probability that the HPSes in single-photon source 1200 produce one and only one photon for a given probe pulse. In some embodiments, additional detector and/or driver logic may be included to allow the HPSes in single-photon source 1200 to generate two photons, three photons, and the like. In general, one pump source may be used to pump the HPSes in the single-photon source to generate one photon within a time period. In some embodiments, the number of pump pulses that are used to generate the desired number of photons can vary. For example, two pump pulses, three pump pulses, and the like can be used for generating one or more single photons with improved probability without departing from the scope of the present disclosure.

Figure 13:
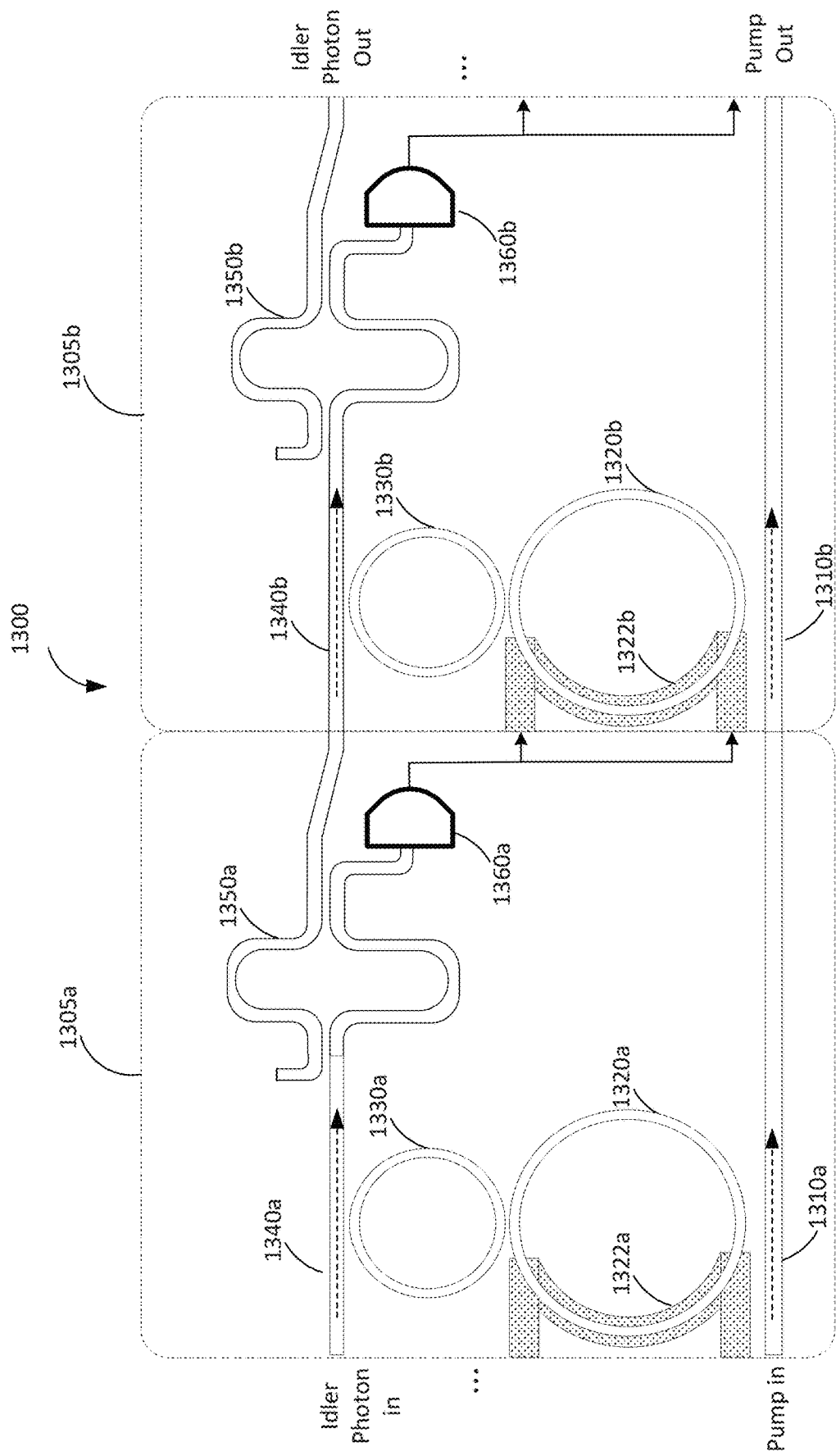
FIG. 13 illustrates an example of a single-photon source that includes a set of cascaded or multiplexed heralded photon sources according to certain embodiments.

FIG. 13 illustrates an example of a single-photon source 1300 that may include a set of cascaded or multiplexed heralded photon sources according to certain embodiments. Single-photon source 1300 may be an example of single-photon source 100 of FIG. 1 described above. Single-photon source 1300 may include multiple heralded photon sources 1305a, 1305b, and the like, which may be collectively referred to as HPSes 1305. Each HPS 1305 may include a photon-pair source as described above with respect to FIGS. 5A-11A. For example, as illustrated in FIG. 13, the photon-pair source in each heralded photon source (e.g., HPS 1305a or 1305b) may include a pump waveguide (e.g., pump waveguide 1310a or 1310b), a pump resonator (e.g., pump resonator 1320a or 1320b), a photon-pair resonator (e.g., photon-pair resonator 1330a or 1330b), and an output waveguide (e.g., output waveguide 1340a or 1340b). Each pump resonator (e.g., pump resonator 1320a or 1320b) may be tuned by a tuner (e.g., tuner 1322a or 1322b) as described above. In some embodiments, each photon-pair resonator (e.g., photon-pair resonator 1330a or 1330b) may also be tuned by a tuner (not shown in FIG. 13) as described above. Each photon-pair source may be configurable to generate pairs of photons (each including a signal photon and an idler photon) based on, for example, SFWM or SPDC. The pairs of photons may be coupled from the photon-pair resonator (e.g., photon-pair resonator 1330a or 1330b) to the output waveguide (e.g., output waveguide 1340a or 1340b).

Each pair of photons may be split by a splitter, such as, for example, a wavelength division demultiplexing (WDDM) device to two different output channels based on their different wavelengths. In the example shown in FIG. 13, the WDDM device may include a Mach Zehnder interferometer (e.g., MZI 1350a or 1350b), which may selectively couple one photon (e.g., the signal photon) at a particular wavelength range to an output channel connected to a single photon detector (SPD) (e.g., SPD 1360a or 1360b), and send the idler photon to the output waveguide of the next HPS (e.g., output waveguide 1340b of HPS 1305b). In some embodiments, the WDDM device may be configured differently compared with the configuration shown in FIG. 13. For example, output waveguide 1340a may be connected to output waveguide 1340b such that the idler photon may pass through output waveguide 1340a to output waveguide 1340b, while the signal photon may be coupled from output waveguide 1340a to the SPD (e.g., SPD 1360a) through the MZI. In some embodiments, the WDDM device (e.g., MZI 1350a or 1350b) may also be tunable by a tuner (not shown in FIG. 13) to tune the wavelength selectivity of the WDDM device.

If a signal photon is detected by the SPD (e.g., SPD 1360a), a corresponding idler photon would exist and would be sent to output waveguide 1340b by the WDDM device. The detection of the signal photon by the SPD (e.g., SPD 1360a) can cause the tuner in the subsequent HPSes (e.g., tuner 1322b of HPS 1305b) to be tuned such that the subsequent photon-pair sources can be switched off or bypassed and would not generate photon pairs. For example, the idler photon generated at HPS 1305a may pass through output waveguide 1340b and photon-pair resonator 1330b of HPS 1305B, and may be sent out by the MZI 1350b as the output photon for HPS 1305b and single-photon source 1300. Similar to single-photon source 1200, single-photon source 1300 also can improve the probability for deterministic heralded photon generation as described above in reference to FIG. 12.

It is noted that the sizes of the resonators shown in the figures described above are for illustration purposes only. In various embodiments, the sizes of the resonators may be changed based on the desired resonance frequency and FSR. For example, a pump ring may be larger or smaller as compared with the photo-pair ring and/or the main ring. Furthermore, the WDDM designs used to separate signal and idler photons described above in reference to FIGS. 1, 12, and 13 are examples only and one of ordinary skill will appreciate that any WDDM can be used without departing from the scope of the present disclosure.

Figure 14:
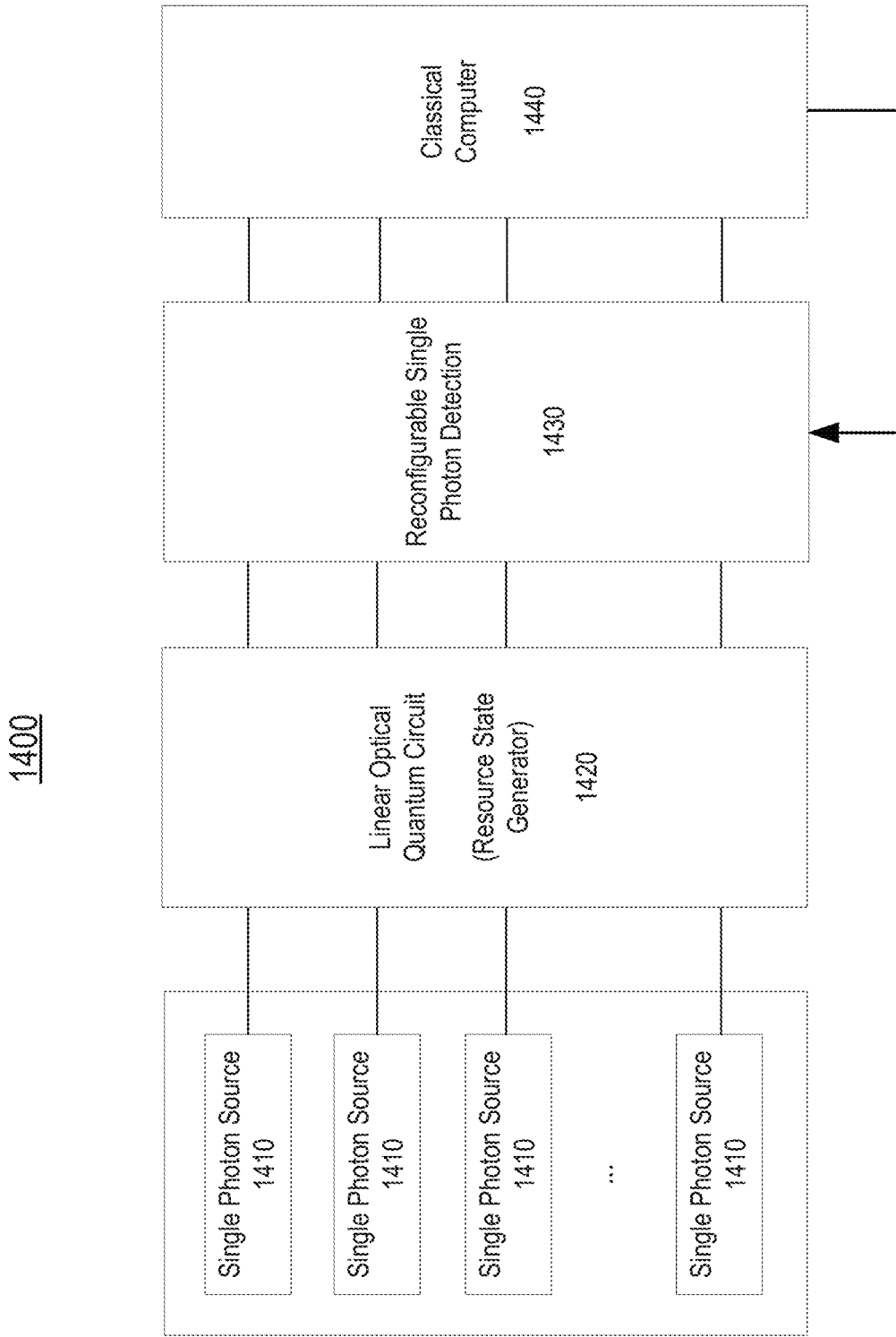
FIG. 14 is a simplified block diagram of an example of a linear optical quantum computer that may use the photon-pair sources and the single-photon sources disclosed herein according to certain embodiments.

FIG. 14 is a simplified block diagram of an example of a linear optical quantum computer (LOQC) 1400 that may use the photon-pair sources and the single-photon sources disclosed herein according to certain embodiments. LOQC 1400 may include multiple single-photon sources 1410, a linear optical quantum computing circuit 1420, a reconfigurable single photon measurement circuit 1430, and a classical computer 1440. Each single-photon source 1410 may be configured to deterministically (or near deterministically) generate a sequence of single photons used as qubits. In some embodiments, single-photon source 1410 may include cascaded (or multiplexed) heralded photon sources based on, for example, spontaneous four wave mixing (SFWM) or spontaneous parametric down-conversion (SPDC) in passive nonlinear optical media. In each heralded photon source (HPS), photons may be non-deterministically produced in pairs (a signal photon and an idler photon), where one photon (e.g., signal photon) heralds the existence of the other photon (e.g., idler) in the pair. Thus, if a signal photon (herald photon) is detected at one heralded photon source, the corresponding idler photon can be used as the output of the single-photon source, while other heralded photon sources in the cascaded (or multiplexed) heralded photon sources of the single-photon source can be bypassed or switched off.

Linear optical quantum computing circuit 1420 may include a network of waveguides, beam splitters, phase shifters, delay lines, and other photonic components and circuits. The photonic components and circuits may be used to implement optical controlled-NOT (CNOT) gates to generate Bell states, and may also be used to implement fusion gates to generate larger entangled cluster states that may be stored in the delay lines.

Reconfigurable single photon measurement circuit 1430 may include a plurality of single photon detectors configured to measure single photons (qubits) in the cluster states based on some measurement pattern, referred to herein as measurement masks.

Classical computer 1440 may decode the results of the measured photons by single photon measurement circuit 1430 and perform some logic processing to generate the computation results. In some embodiments, classical computer 1440 may feedback the decoding results to single photon measurement circuit 1430. For example, based on the decoding results, classical computer 1440 may adjust some measurement masks or finalize some measurement masks that are not pre-determined for use by single photon measurement circuit 1430.

Linear optical quantum computer (LOQC) 1400 may include millions of optical components, such as couplers, resonators, single photon detectors, beam splitters, interferometers, switches, phase shifters, and delay lines. Thus, it may be impractical to implement an LOQC using discrete optical components due to the sizes of these components and the cost to align and assemble these optical components. According to certain embodiments, these optical components may be fabricated as photonic integrated circuits (PICs) on a semiconductor wafer, such as silicon-photonic integrated circuits on a silicon wafer, using semiconductor processing technologies.

Linear optical quantum computer (LOQC) 1400 may also include many electronic integrated circuits (EICs), including, for example, the control logic for the herald single-photon sources, switches, etc. To achieve a high performance (e.g., high speed), the interconnects between the electronic circuits and the photonic integrated circuits may need to be minimized. In addition, many components of LOQC 1400 may need to operate at cryogenic temperatures, such as below 140 K or below 5 K, in order to achieve the desired performance.

It will be apparent to those skilled in the art that substantial variations may be made in accordance with specific implementations. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used.

Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A device comprising:
    a pump waveguide configured to transport pump photons;
    a first Mach-Zehnder interferometer (MZI) coupled to the pump waveguide;
    a first resonator coupled to the first MZI and characterized by a first resonance linewidth;
    a second resonator coupled to the first resonator and characterized by a second resonance linewidth less than the first resonance linewidth;
    a second MZI coupled to the second resonator; and
    an output waveguide coupled to the second MZI.

2. The device of claim 1, wherein:
    the first MZI is configured to couple pump photons propagating in the pump waveguide into the first resonator;
    the second resonator is configured to convert the pump photons into photon pairs; and
    the second MZI is configured to couple the photon pairs propagating in the second resonator into the output waveguide.

3. The device of claim 2, wherein coupling-induced resonance splitting occurs in at least one of the second resonator or the first resonator at a wavelength of the pump photons.

4. The device of claim 2, wherein the second resonator includes a non-linear optical material that causes spontaneous four wave mixing (SFWM) using the pump photons.

5. The device of claim 1, wherein the first resonator includes a first tuner or the second resonator includes a second tuner.

6. The device of claim 1, further comprising a splitter coupled to the output waveguide, wherein the splitter is configured to direct photons that have different wavelengths in each photon pair to two different output channels.

7. The device of claim 6, wherein the splitter includes a wavelength division demultiplexer (WDDM).

8. The device of claim 6, further comprising a single photon detector coupled to one of the two different output channels.

9. The device of claim 1, further comprising two or more electrodes, wherein:
    the first MZI includes a tunable portion; and
    the two or more electrodes are configured to apply a voltage signal at the tunable portion to cause a refractive index change in the tunable portion of the first MZI.

10. The device of claim 1, further comprising two or more electrodes, wherein:
    the second MZI includes a tunable portion; and
    the two or more electrodes are configured to apply a voltage signal at the tunable portion to cause a refractive index change in the tunable portion of the second MZI.

11. The device of claim 1, wherein at least one of the first resonator or the second resonator is elongated in a first direction, and the first resonator and the second resonator are coupled along the first direction.

12. The device of claim 1, wherein at least one of the first resonator or the second resonator includes Euler bends.

13. The device of claim 1, wherein a coupling length between the first MZI and the first resonator, a coupling length between the first resonator and the second resonator, and a coupling length between the second MZI and the output waveguide are each greater than a respective threshold value.

14. A single-photon source comprising:
    a plurality of heralded photon sources, each of the plurality of heralded photon sources comprising:
        a pump waveguide configured to transport pump photons;
        a first Mach-Zehnder interferometer (MZI) coupled to the pump waveguide;
        a first resonator coupled to the first MZI;
        a second resonator coupled to the first resonator;
        a second MZI coupled to the second resonator; and
        an output waveguide coupled to the second MZI.

15. The single-photon source of claim 14, wherein:
    the first MZI is configured to couple pump photons propagating in the pump waveguide into the first resonator;
    the second resonator is configured to convert the pump photons into photon pairs; and
    the second MZI is configured to couple the photon pairs propagating in the second resonator into the output waveguide.

16. The single-photon source of claim 15, wherein:
    the first resonator is characterized by a first quality factor lower than a second quality factor of the second resonator; and
    coupling-induced resonance splitting occurs in at least one of the second resonator or the first resonator at a wavelength of the pump photons.

17. The single-photon source of claim 14, wherein each of the plurality of heralded photon sources further comprises a wavelength division demultiplexer (WDDM) coupled to the output waveguide, wherein the WDDM is configured to direct photons that have different wavelengths in each photon pair to two different output channels.

18. The single-photon source of claim 17, wherein each of the plurality of heralded photon sources further comprises a single photon detector coupled to one of the two different output channels.

19. The single-photon source of claim 14, wherein each of the plurality of heralded photon sources further comprises two or more electrodes, wherein:
   the first MZI includes a tunable portion; and
   the two or more electrodes are configured to apply a voltage signal at the tunable portion to cause a refractive index change in the tunable portion of the first MZI.

20. The single-photon source of claim 14, wherein each of the plurality of heralded photon sources further comprises two or more electrodes, wherein:
   the second MZI includes a tunable portion; and
   the two or more electrodes are configured to apply a voltage signal at the tunable portion to cause a refractive index change in the tunable portion of the second MZI.

* * * * *